US012666450B2

(12) United States Patent
Ji et al.

(10) Patent No.: US 12,666,450 B2
(45) Date of Patent: Jun. 23, 2026

(54) RESOURCE SELECTION METHOD AND APPARATUS AND SYSTEM

(71) Applicant: 1FINITY Inc., Kawasaki (JP)

(72) Inventors: Pengyu Ji, Beijing (CN); Jian Zhang, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 304 days.

(21) Appl. No.: 18/219,141

(22) Filed: Jul. 7, 2023

(65) Prior Publication Data

US 2023/0354388 A1     Nov. 2, 2023

Related U.S. Application Data

(63) Continuation of application No. PCT/CN2021/071945, filed on Jan. 14, 2021.

(51) Int. Cl.
*H04W 72/25* (2023.01)
*H04W 72/0446* (2023.01)
(Continued)

(52) U.S. Cl.
CPC ....... *H04W 72/40* (2023.01); *H04W 72/0446* (2013.01); *H04W 76/28* (2018.02)

(58) Field of Classification Search
CPC ..... H04W 72/02; H04W 72/25; H04W 72/40; H04W 76/14; H04W 76/28; H04W 4/40; H04W 72/0446; H04W 92/18
(Continued)

(56) References Cited

U.S. PATENT DOCUMENTS

| | | | | |
|---|---|---|---|---|
| 11,956,782 B2 * | 4/2024 | Shilov | ................... | H04W 24/08 |
| 12,309,749 B2 * | 5/2025 | Kang | ................... | H04W 72/02 |

(Continued)

FOREIGN PATENT DOCUMENTS

| | | |
|---|---|---|
| CN | 110972273 A | 4/2020 |
| CN | 111149397 A | 5/2020 |

(Continued)

OTHER PUBLICATIONS

International Search Report and Written Opinion of the International Searching Authority issued by the China National Intellectual Property Administration for corresponding International Patent Application No. PCT/CN2021/071945, mailed on Oct. 9, 2021, with a partial English translation.
(Continued)

*Primary Examiner* — John Pezzlo
(74) *Attorney, Agent, or Firm* — Myers Wolin, LLC

(57) ABSTRACT

A resource selection apparatus, configured in a first terminal equipment, the resource selection apparatus includes a transmitter configured to transmit sidelink data to a second terminal equipment, the second terminal equipment being configured with sidelink discontinuous reception (SL DRX), and processor circuitry configured to generate a first candidate resource set and a second candidate resource set, the first candidate resource set being a set of one or more candidate resources within an overlapped time period of a selection window of the first terminal equipment and at least one continuous SL DRX active time of the second terminal equipment during the selection window, the second candidate resource set being a set of all candidate resources within the selection window of the first terminal equipment, and determine candidate resources in the first candidate resource set available for sidelink data transmission to obtain a first candidate resource subset.

10 Claims, 9 Drawing Sheets

501

> the first terminal equipment generates a first candidate resource set and a second candidate resource set, the first candidate resource set being a set of all candidate resources within an overlapped time period of a selection window of the first terminal equipment and at least one continuous SL DRX active time of the second terminal equipment during the selection window

502

> the first terminal equipment respectively determines candidate resources in the first candidate resource set available for sidelink data transmission and candidate resources in the second candidate resource set available for sidelink data transmission to obtain a first candidate resource subset and a second candidate resource subset

503

> the first terminal equipment selects resources for transmitting a first predetermined number of times of transmission of sidelink data in the first candidate resource subset, and selects resources for transmitting a remained number of times of transmission of sidelink data in the second candidate resource subset

(51) Int. Cl.
 *H04W 72/40* (2023.01)
 *H04W 76/28* (2018.01)

(58) Field of Classification Search
 USPC ................................. 370/252, 329, 430, 278
 See application file for complete search history.

(56) References Cited

U.S. PATENT DOCUMENTS

| | | | |
|---|---|---|---|
| 2020/0280961 A1 | 9/2020 | Lee et al. | |
| 2020/0351857 A1 | 11/2020 | Bharadwaj et al. | |
| 2021/0211208 A1* | 7/2021 | Wali | G01R 29/0857 |
| 2022/0110055 A1* | 4/2022 | Hosseini | H04W 52/0229 |
| 2022/0394559 A1* | 12/2022 | Lee | H04W 72/56 |
| 2023/0098973 A1 | 3/2023 | Yang | |
| 2023/0403681 A1* | 12/2023 | Wen | H04W 52/0216 |
| 2024/0057207 A1* | 2/2024 | Basu Mallick | H04W 76/28 |
| 2024/0098764 A1* | 3/2024 | Ashraf | H04W 76/14 |

FOREIGN PATENT DOCUMENTS

| | | | |
|---|---|---|---|
| CN | 111480391 A | 7/2020 | |
| JP | 2023-545194 A | 10/2023 | |
| WO | 2022/083769 A1 | 4/2022 | |

OTHER PUBLICATIONS

OPPO, "Power saving mechanisms in NR sidelink", Agenda Item: 8.11.2.1, 3GPP TSG-RAN WG1 #103-e, R1-2008239, e-Meeting, Oct. 26-Nov. 13, 2020.

Intel Corporation, "Resource Allocation Enhancements for NR Sidelink", Agenda Item: 8.15.3, 3GPP TSG-RAN WG2 Meeting #112e, R2-2008986, e-Meeting, Nov. 2-13, 2020.

3GPP TS 38.212 V16.4.0, "3rd Generation Partnership Project; Technical Specification Group Radio Access Network; NR; Multiplexing and channel coding (Release 16)", Dec. 2020.

3GPP TS 38.321 V16.4.0, "3rd Generation Partnership Project; Technical Specification Group Radio Access Network; NR; Medium Access Control (MAC) protocol specification (Release 16), Mar. 2021.

3GPP TS 38.214 V16.4.0, "3rd Generation Partnership Project; Technical Specification Group Radio Access Network; NR; Physical layer procedures for data (Release 16)", Dec. 2020.

3GPP TS 38.213 V16.4.0, "3rd Generation Partnership Project; Technical Specification Group Radio Access Network; NR; Physical layer procedures for control (Release 16)", Dec. 2020.

3GPP TS 38.215 V16.4.0, "3rd Generation Partnership Project; Technical Specification Group Radio Access Network; NR; Physical layer measurements (Release 16)", Dec. 2020.

Notice of Reasons for Refusal issued by the Japan Patent Office for corresponding Japanese Patent Application No. 2023-541354, mailed on Jun. 4, 2024, with an English translation.

Vivo, "Resource allocation for sidelink power saving", Agenda Item: 8.11.2.1, 3GPP TSG-RAN WG1 #103-e, R1-2007688, E-Meeting, Oct. 26-Nov. 13, 2020.

LG Electronics, "Discussion on physical layer design considering sidelink DRX operation", Agenda Item: 8.11.3, 3GPP TSG-RAN WG1 #103-e, R1-2007897, E-Meeting, Oct. 26-Nov. 13, 2020.

First Notification of Office Action and Search Report issued by the China National Intellectual Property Administration for corresponding Chinese Patent Application No. 202180087868.8, mailed on Jan. 19, 2026, with an English translation.

\* cited by examiner

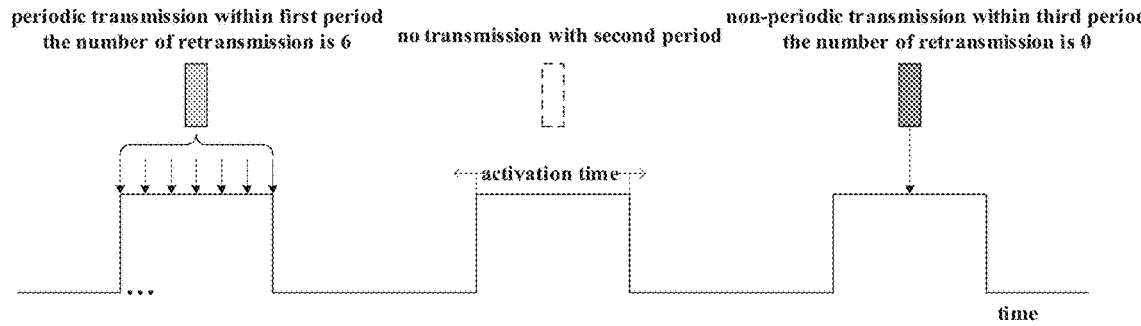

periodic transmission within first period the number of retransmission is 6 no transmission with second period non-periodic transmission within third period the number of retransmission is 0 activation time time

FIG. 4

501 the first terminal equipment generates a first candidate resource set and a second candidate resource set, the first candidate resource set being a set of all candidate resources within an overlapped time period of a selection window of the first terminal equipment and at least one continuous SL DRX active time of the second terminal equipment during the selection window

502 the first terminal equipment respectively determines candidate resources in the first candidate resource set available for sidelink data transmission and candidate resources in the second candidate resource set available for sidelink data transmission to obtain a first candidate resource subset and a second candidate resource subset

503 the first terminal equipment selects resources for transmitting a first predetermined number of times of transmission of sidelink data in the first candidate resource subset, and selects resources for transmitting a remained number of times of transmission of sidelink data in the second candidate resource subset

FIG. 5

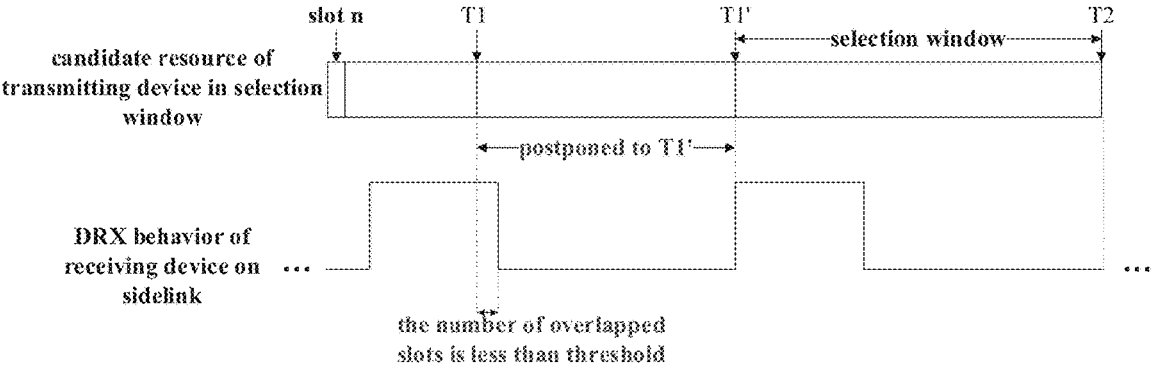

FIG. 13

1401 the first terminal equipment selects transmission resources for transmitting sidelink data in a candidate resource subset, wherein the first terminal equipment first selects one transmission resource in candidate resources of an overlapped time period of a selection window of the first terminal equipment and a continuous SL DRX activation time of the second terminal equipment during the selection window, then selects remaining transmission resources other than candidate resources before a predetermined time unit of the selection window of the first terminal equipment

FIG. 14

1700
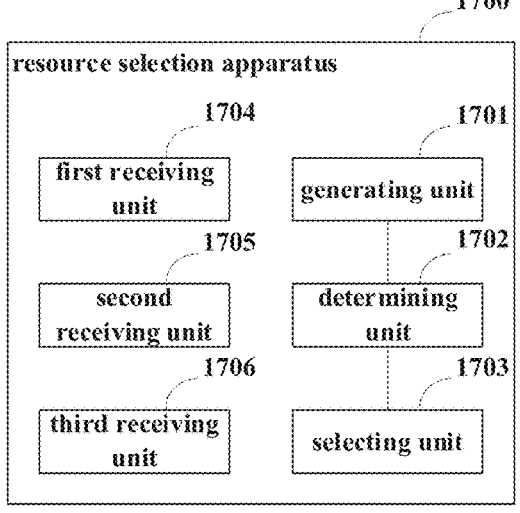
FIG. 17
1800
resource selection apparatus
1801 generating unit
1804 transmitting unit
1802 determining unit
1803 selecting unit
FIG. 18
1900
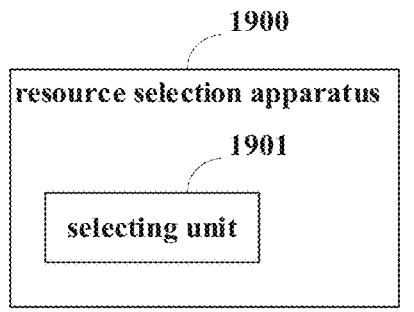
FIG. 19
2000
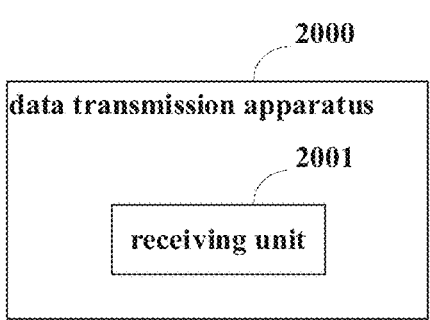
FIG. 20

RESOURCE SELECTION METHOD AND APPARATUS AND SYSTEM

CROSS-REFERENCE TO RELATED APPLICATION

This application is a continuation application of International Application PCT/CN2021/071945 filed on Jan. 14, 2021, and designated the U.S., the entire contents of which are incorporated herein by reference.

FIELD

This disclosure relates to the field of communication technologies.

BACKGROUND

In existing standards, discontinuous reception (DRX) may be configured on a Uu link for a terminal equipment to achieve a goal of enabling the terminal equipment to save power. A semi-statically periodically running timer, referred to as drx-OnDurationTimer, may be configured for the terminal equipment, and during running of the timer, the terminal equipment needs to perform blind detection on a downlink control channel (PDCCH); and in the rest of the time, the terminal equipment may not perform detection on the PDCCH, and may even turn off a receiving radio frequency based on implementation, so as to achieve a goal of saving power.

On the other hand, based on a semi-statically periodically running DRX mechanism, Uu DRX also introduces a timer started to run based on an event, which, when a condition is satisfied, is able to dynamically enable the terminal equipment to be switched to an active state to perform blind detection on a PDCCH. Specifically, the terminal equipment may be dynamically set to be in an active state according to drx-RetransmissionTimerDL or drx-RetransmissionTimerUL configured per HARQ process, which are respectively used to detect PDCCHs scheduling retransmissions on a downlink (DL) and an uplink (UL). Based on the above Uu DRX operating mechanism, the terminal equipment is able to be in an active state at a time when a network device possibly schedules retransmissions, thereby ensuring that the terminal equipment is able to detect and receive PDCCHs scheduling retransmissions.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that in Rel-16 NR V2X (New Radio V2X (vehicle to everything) Release 16), for Mode 2 (a terminal equipment autonomously selects a transmission resource), the transmission resource of the terminal equipment is obtained by a sensing process and a resource selection process. That is, the terminal equipment needs to obtain a resource occupancy situation within an entire resource pool by the sensing process, and then selects appropriate resources for transmitting data packets.

On the other hand, in a sidelink enhancement subject in Rel-17 (Release 17), further enhancement needs to be performed on sidelink transmission based on the New Radio (NR) technology, in which an important goal is to study and design a power-saving mechanism for certain terminal equipments on a sidelink, such as a handheld terminal equipment (P-UE). The DRX mechanism, as an effective energy-saving mechanism applied to Uu interfaces, may be reused on a sidelink as a baseline. However, if a receiving device is configured with SL DRX, a transmitting device needs to take the SL DRX configuration into account to ensure that when it transmits data, the receiving device is in an SL DRX active state; otherwise, the receiving device is unable to receive and correctly decode the transmitted data packets.

Therefore, if the transmitting device operates in Mode 2, it is needed to enhance the existing resource selection process to ensure that a time corresponding to the resources selected by the transmitting device is at the SL DRX active time of the receiving device, thereby avoiding drop of packets due to the receiving device not being in a receiving state, as shown in FIG. 1; and on the other hand, reliability degradation due to introduction of the SL DRX may be avoided, as shown in FIG. 2.

In order to solve at least one of the above problems, embodiments of this disclosure provide a resource selection method and apparatus and a system.

According to an aspect of the embodiments of this disclosure, there is provided a resource selection apparatus, configured in a first terminal equipment, the first terminal equipment transmitting sidelink data to a second terminal equipment, the second terminal equipment being configured with sidelink discontinuous reception (SL DRX), the apparatus including:

a generating unit configured to generate a first candidate resource set and a second candidate resource set, the first candidate resource set being a set of all candidate resources within an overlapped time period of a selection window of the first terminal equipment and at least one continuous SL DRX active time of the second terminal equipment during the selection window;

a determining unit configured to respectively determine candidate resources in the first candidate resource set available for sidelink data transmission and candidate resources in the second candidate resource set available for sidelink data transmission to obtain a first candidate resource subset and a second candidate resource subset; and a selecting unit configured to select resources for transmitting a first predetermined number of times of transmission of sidelink data in the first candidate resource subset, and select resources for transmitting a remained number of times of transmission of sidelink data in the second candidate resource subset.

According to another aspect of the embodiments of this disclosure, there is provided a resource selection apparatus, configured in a first terminal equipment, the first terminal equipment transmitting sidelink data to a second terminal equipment, the second terminal equipment being configured with discontinuous reception, the apparatus including:

a generating unit configured to generate a third candidate resource set;

a determining unit configured to determine candidate resources available for sidelink data transmission in the third candidate resource set to obtain a third candidate resource subset; and a selecting unit configured to select resources for transmitting sidelink data in the third candidate resource subset, wherein the third candidate resource subset includes candidate resources in the selection window of the first terminal equipment other than all candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts.

According to a further aspect of the embodiments of this disclosure, there is provided a resource selection apparatus, configured in a first terminal equipment, the first terminal equipment transmitting sidelink data to a second terminal equipment, the second terminal equipment being configured with discontinuous reception, the apparatus including:

a selecting unit configured to select transmission resources for transmitting sidelink data in a candidate resource subset, wherein the selecting unit first selects one transmission resource in the candidate resource subset, the one transmission resource being selected in candidate resources of an overlapped time period of a selection window of the first terminal equipment and a continuous SL DRX active time of the second terminal equipment during the selection window;

and the selecting unit selects remaining transmission resources in the candidate resource subset other than candidate resources before a predetermined time unit of the selection window of the first terminal equipment, the predetermined time unit referring to an overlapped first slot of the period of the selection window of the first terminal equipment and a continuous SL DRX active time of the second terminal equipment where the first selected transmission resource is present.

An advantage of the embodiments of this disclosure exists in that with the enhanced resource selection mechanism of the transmitting device, it may be ensured that, in the case where the receiving device is configured with the SL DRX, the transmitting device is able to perform data packet transmission during the SL DRX active time of the receiving device, thereby avoiding occurrence of a case where data packets are unable to be received and decoded due to an inactive state of the receiving device, and ensuring reliability of transmission of data packets.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

FIG. 4 is a schematic diagram of unnecessary power consumption due to transmission resource limitation during OnDurationTimer operation;

FIG. 5 is a schematic diagram of the resource selection method of an embodiment of this disclosure;

FIG. 13 is another schematic diagram of the case where the continuous SL DRX active time of the receiving device overlaps with the selection window of the transmitting device;

FIG. 14 is a schematic diagram of the resource selection method of an embodiment of this disclosure;

FIG. 17 is a schematic diagram of the resource selection apparatus of an embodiment of this disclosure;

FIG. 18 is another schematic diagram of the resource selection apparatus of the embodiment of this disclosure;

FIG. 19 is a further schematic diagram of the resource selection apparatus of the embodiment of this disclosure;

FIG. 20 is a schematic diagram of a data transmission apparatus of an embodiment of this disclosure.

DETAILED DESCRIPTION

Figure 1:
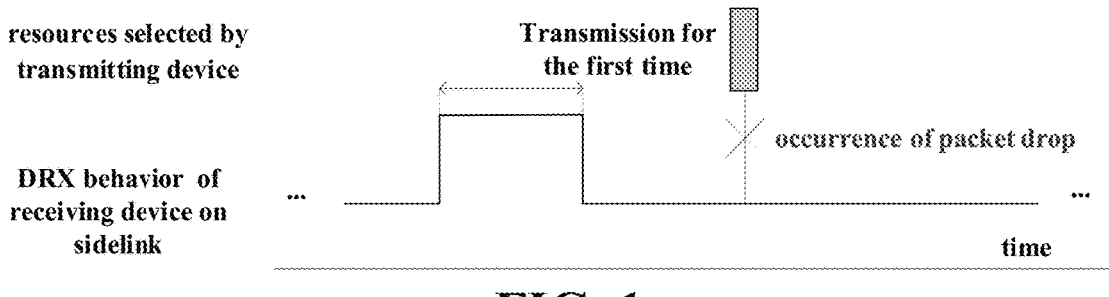
FIG. 1 is schematic diagram of data drop in a case where a receiving device is configured with SL DRX.
Figure 2:
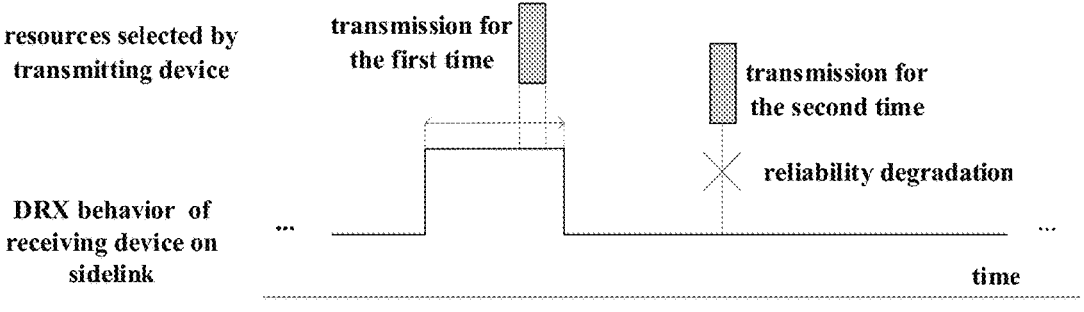
FIG. 2 is a schematic diagram of reliability degradation in the case where the receiving device is configured with SL DRX.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "a terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

In the above embodiments, the terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above. "A device" in this text may refer to a network device, and may also refer to a terminal equipment, except otherwise specified.

A scenario of an embodiment is this disclosure shall be described below by way of examples; however, this disclosure is not limited thereto.

Figure 3:
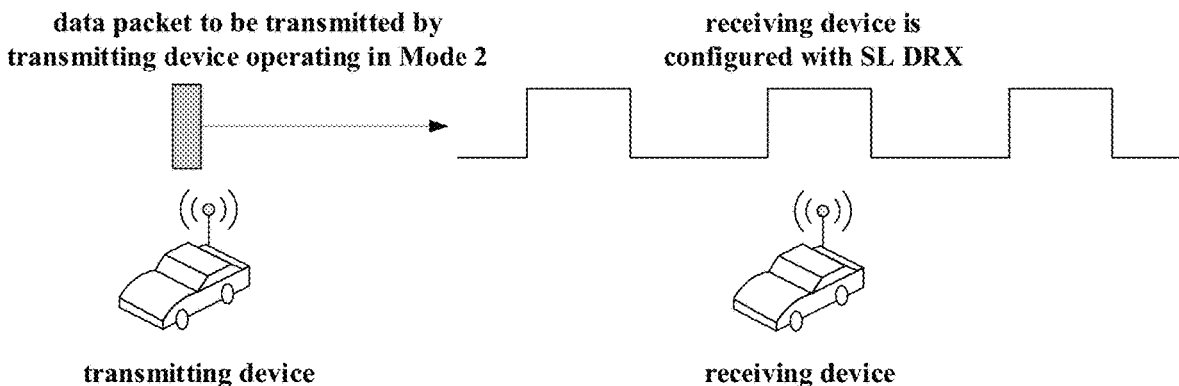
FIG. 3 is a schematic diagram of an application scenario of an embodiment of this disclosure.

FIG. 3 is a schematic diagram of an application scenario of an embodiment of this disclosure. As shown in FIG. 3, in this scenario, the transmitting device (Tx UE) operates in Mode 2, the receiving device (Rx UE) is configured with SL DRX, and the transmitting device transmits data packets to the receiving device in a unicast manner. It should be noted that FIG. 3 takes a unicast scenario as an example; however, this disclosure is not limited thereto, and the embodiment of this application may also be applicable to a groupcast or broadcast scenario.

In the RAN2 (Radio Access Network Group 2) 112-e conference, at least for a unicast scenario, it was agreed to reuse a timer-based mechanism in a Uu interface to control an SL DRX behavior mechanism of a receiving device, i.e. controlling the SL DRX mechanism of the receiving device on a sidelink by such timers as drx-OnDurationTimer, drx-Inactivity Timer, drx-HARQ-RTT-Timer, and drx-RetransmissionTimer, etc. It was proposed by some corporations that after configuring the receiving device with SL DRX or obtaining SL DRX configuration of the receiving device, in selecting resources by the transmitting device, it should be ensured that all selected resources are within the operating period of drx-OnDurationTimer of the receiving device, which may ensure that the receiving device is surely in an active state when data packets are transmitted. A disadvantage of this method is that if the transmitting device needs to support a relatively large number of times of retransmission (up to 32 times in NR V2X), a value of drx-OnDurationTimer needs to be configured to be of a relatively large value. However, as this timer runs semi-statically and periodically, such services may not always exist (such as being aperiodic), which may result in unnecessary additional power consumption. FIG. 4 is a schematic diagram of unnecessary power consumption due to transmission resource limitation during OnDurationTimer operation.

It was found by the inventors that as resource reservation may be indicated by SCI (sidelink control information) on the SL, the transmitting device may possibly only need to ensure that initial transmission (or former some times of transmission) is within the semi-statically operating period of drx-OnDurationTimer of the receiving device, and for the remaining times of transmission, the receiving device may reserve or dynamically start that drx-RetransmissionTimer is in the SL DRX active state. This method may ensure that the receiving device may correctly receive and decode data packets, reliability is not significantly reduced, and excessive additional power consumption is not produced. Based on this scheme, an existing resource selection process at a transmitting device side needs to be enhanced to ensure that selected resources satisfy requirements.

In addition, in an existing resource selection process, the resource selection process is jointly completed by a physical layer and an MAC layer, wherein the physical layer of the terminal equipment may first generate a candidate resource set, and then exclude candidate resources therein that are unavailable for sidelink transmission, so as to obtain a candidate resource subset.

The candidate resource subset includes candidate resources in the above candidate resource set that are available for sidelink data transmission, the physical layer of the terminal equipment reports the candidate resource subset to the MAC (media access control) layer, and the MAC layer selects resources for transmitting sidelink data from the reported candidate resource subset. Reference may be made to Chapter 8.1.4 of 3GPP technical specification TS38.214-g40 for a specific process.

Embodiments of this disclosure shall be described below with reference to the accompanying drawings and particular implementations.

Embodiment of a First Aspect

The embodiment of this disclosure provides a resource selection method, which shall be described from a side of a first terminal equipment. The first terminal equipment may transmit sidelink data to a second terminal equipment, and the second terminal equipment is configured with SL DRX. Here, the SL DRX configuration may be configured by a network device for the second terminal equipment, or may be preconfigured, or may be configured by the first terminal equipment for the second terminal equipment, or may be configured by the second terminal equipment for itself according to a demand of its own for power saving, and this disclosure is not limited thereto. In addition, from the perspective of sidelink data transmission, the first terminal equipment in the embodiment of this disclosure is a transmitting device, and the second terminal equipment is a receiving device.

FIG. 5 is a schematic diagram of the resource selection method of the embodiment of this disclosure. As shown in FIG. 5, the method includes:

501: the first terminal equipment generates a first candidate resource set and a second candidate resource set, the first candidate resource set being a set of all candidate resources within an overlapped time period of a selection window of the first terminal equipment and at least one continuous SL DRX active time of the second terminal equipment during the selection window;

502: the first terminal equipment respectively determines candidate resources in the first candidate resource set available for sidelink data transmission and candidate resources in the second candidate resource set available for sidelink data transmission to obtain a first candidate resource subset and a second candidate resource subset; and

503: the first terminal equipment selects resources for transmitting a first predetermined number of times of transmission of sidelink data in the first candidate resource subset, and selects resources for transmitting a remained number of times of transmission of sidelink data in the second candidate resource subset.

It should be noted that FIG. 5 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 5.

Unlike in existing technologies where a physical layer only generates one candidate resource set $S_A$ and a candidate resource subset in $S_A$ is reported to an MAC layer for resource selection. In the embodiment of this disclosure, the physical layer separately generates two candidate resource sets, i.e., the first candidate resource set $S_{A1}$ and the second candidate resource set $S_{A2}$, determines candidate resources therefrom available for sidelink data transmission to obtain two candidate resource subsets, and reports them respectively to the MAC layer. Therefore, it may be ensured that the MAC layer surely has sufficient candidate resources in a candidate resource subset corresponding SA1 for random selection, which may ensure as possibly that the selected transmission resources of the transmitting device for initial transmission overlap with SL DRX active time of the receiving device, and may reduce power consumption of the receiving device as possible.

In the embodiment of this disclosure, within the time overlapping the continuous SL DRX active time of the second terminal equipment, a retransmission mode of the first terminal equipment is blind retransmission, and a retransmission mode within the remaining time is retransmission based on HARQ-ACK. Here, the transmission resources used by the first terminal within the continuous SL DRX active time of the second terminal equipment include but not limited to resources selected from the first candidate resource subset.

In the embodiment of this disclosure, in 501, the continuous SL DRX active time of the second terminal equipment during the selection window of the first terminal equipment is at least one continuous slot, the at least one continuous slot being an operating period of a discontinuous reception duration timer (drx-OnDurationTimer) on a sidelink of the second terminal equipment, or an operating period of a discontinuous reception inactivity timer (drx-Inactivity-Timer) on a sidelink of the second terminal equipment, or an operating period of a discontinuous reception retransmission timer (drx-RetransmissionTimer) on a sidelink of the second terminal equipment, or a combination of operating periods of timers on one or more sidelinks in the timers on the above three sidelinks, that is, the above active time of the second terminal equipment during the selection window of the first terminal equipment may be one or more operating periods of the timers on the above three sidelinks.

In the embodiment of this disclosure, it should be noted that the names of the timers on the above sidelinks are examples only, this disclosure is not limited thereto, and the timers on the above three sidelinks may also use other names.

In some embodiments, if the selection window of the first terminal equipment overlaps with a continuous SL DRX active time of the second terminal equipment during the selection window, the first candidate resource set is a set of all candidate resources within the overlapped time period.

In some embodiments, if the selection window of the first terminal equipment overlaps with more than one continuous SL DRX active time of the second terminal equipment during the selection window, the first candidate resource set is a set of all candidate resources within an overlapped time period of the selection window of the first terminal equipment and all continuous SL DRX active time of the second terminal equipment during the selection window, or the first candidate resource set is a set of all candidate resources within an overlapped time period of the selection window of the first terminal equipment and a first continuous SL DRX active time of the second terminal equipment during the selection window or a next continuous SL DRX active time of the second terminal equipment after the selection window starts.

In the above embodiment, each continuous SL DRX active time of the second terminal equipment within the selection window of the first terminal equipment may be defined as a sub-selection window, that is, the sub-selection window refers to a time period during which the selection window of the first terminal equipment overlaps with each continuous SL DRX active time of the second terminal equipment during the selection window. Then, the first candidate resource set may be a set of all candidate resources within a first sub-selection window of the selection window of the first terminal equipment, or may also be a set of all candidate resources within all sub-selection windows of the selection window of the first terminal equipment.

In the embodiment of this disclosure, in some embodiments, the second candidate resource set may be a set of remaining candidate resources within the selection window of the first terminal equipment other than the first candidate resource set, or may be a set of all candidate resources within the selection window of the first terminal equipment, or may be a set of remaining candidate resources within the selection window of the first terminal equipment other than the first candidate resource set and candidate resources before a predetermined time unit within the selection window of the first terminal equipment, or may be a set of remaining candidate resources within the selection window of the first terminal equipment other than candidate resources before a predetermined time unit. The predetermined time unit refers to an overlapped first slot of the selection window of the first terminal equipment and a first continuous SL DRX active time of the second terminal equipment during the selection window or a next continuous SL DRX active time of the second terminal equipment after the selection window starts.

Figure 6:
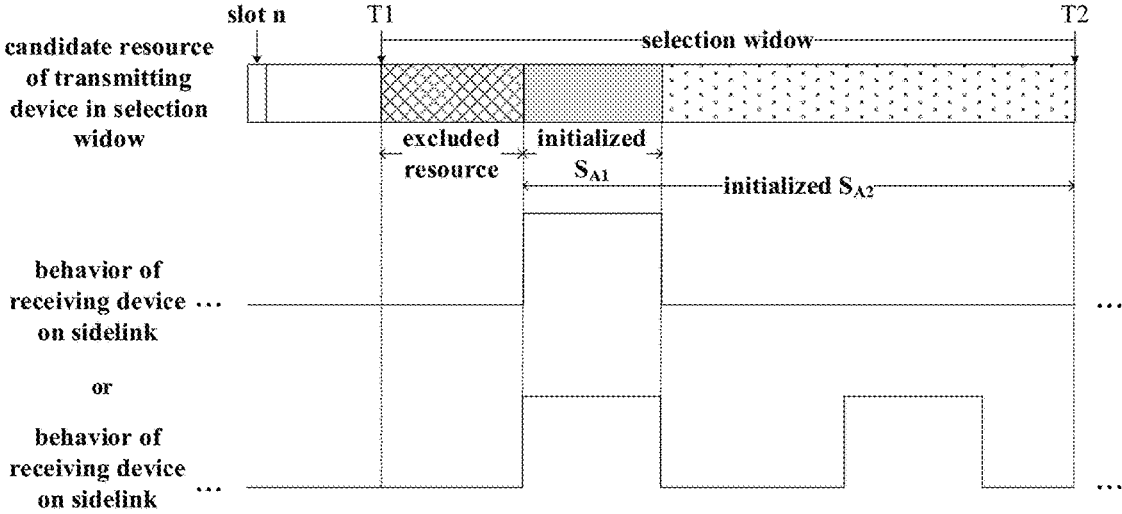
FIG. 6 is a schematic diagram of an example of a first candidate resource set and a second candidate resource set.

FIG. 6 is a schematic diagram of an example of the first candidate resource set and the second candidate resource set. As shown in FIG. 6, in this example, the first candidate resource set ($S_{A1}$) is the set of all candidate resources within the overlapped time period of the selection window of the first terminal equipment (n+T1→n+T2; where, n is a slot where an higher layer of the first terminal equipment notifies a physical layer of parameters related to the resource selection) and the first continuous SL DRX active time of the second terminal equipment during the selection window, and the second candidate resource set ($S_{A2}$) is the set of remaining candidate resources within the selection window of the first terminal equipment after candidate resources before a predetermined time unit are removed. Here, the predetermined time unit is a first slot where the selection window of the first terminal equipment overlaps with the first continuous SL DRX active time of the second terminal equipment during the selection window period.

Figure 7:
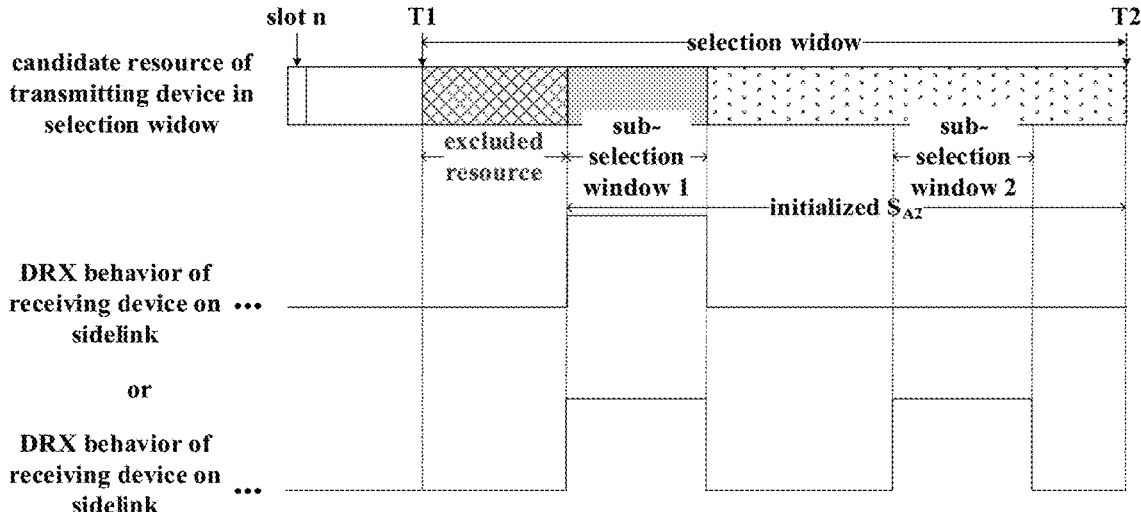
FIG. 7 is another schematic diagram of the example of the first candidate resource set and the second candidate resource set.

FIG. 7 is another schematic diagram of the example of the first candidate resource set and the second candidate resource set. Unlike the example in FIG. 6, in the example in FIG. 7, each continuous SL DRX active time of the second terminal equipment within the selection window of the first terminal equipment is defined as a sub-selection window, hence, the first candidate resource set ($S_{A1}$) is the set of all candidate resources within the first sub-selection window (sub-selection window 1) of the first terminal equipment, and the second candidate resource set ($S_{A2}$) is the set of remaining candidate resources within the selection window of the first terminal equipment after the candidate resources before the predetermined time unit are removed. Here, the predetermined time unit is a first slot where the selection window of the first terminal equipment overlaps with the first continuous SL DRX active time of the second terminal equipment during the selection window period.

In the embodiment of this disclosure, in 501, the higher layer of the first terminal equipment may notify the physical layer of parameters used for generating the above two candidate resource sets, the parameters notified by the higher layer of the first terminal equipment to the physical layer may be notified for respectively generating the above two candidate resource sets, and values of the above parameters may be configured separately and are not equal. Therefore, the physical layer may respectively generate the above two candidate resource sets by using different parameters notified by the higher layer.

For example, the physical layer of the first terminal equipment receives transmission parameters for the first candidate resource set and transmission parameters for the second candidate resource set notified by the higher layer of the first terminal equipment, including set, wherein a value of a transmission priority ($prio_{TX}$) in the transmission parameters for the first candidate resource set is less than a value of a transmission priority in the transmission parameters for the second candidate resource set, the smaller the value of the priority, the higher the priority, and/or, the number of sub-channels ($L_{subCH}$) used for transmission of sidelink data (PSSCHs) in a slot in the transmission parameters for the first candidate resource set is greater than or less than the number of sub-channels used for transmission of sidelink data in a slot in the transmission parameters for the second candidate resource set.

In the embodiment of this disclosure, in 502, after initialization of the first candidate resource set $S_{A1}$ and the second candidate resource set $S_{A2}$ is completed, resource exclusion is performed on the two candidate resource sets independently (i.e. candidate resources in the two candidate resource sets available for sidelink data transmission are determined respectively), so as to obtain two candidate resource subsets, i.e., a first candidate resource subset and a second candidate resource subset, and the parameters for resource exclusion on the two candidate resource sets may be identical or different.

In some embodiments, reference may be made to section 8.1.4 of Release G40 of the technical specification TS 38.213 of 3GPP for a resource exclusion method for the two candidate resource sets, until both the candidate resource sets satisfy conditions on remaining resources in section 8.1.4 of TS 38.213. Thus, the physical layer of the first terminal equipment may report the two candidate resource subsets obtained after the resource exclusion to the higher layer (an MAC layer).

In some other embodiments, reference may be made to section 8.1.4 of TS 38.213 for a resource exclusion method for the second candidate resource set, while a resource exclusion method for the first candidate resource set may use parameters different from those in the resource exclusion method for the second candidate resource set.

For example, an RSRP (reference signal received power) threshold used in performing resource exclusion on the first candidate resource set (i.e., determining the candidate resources available for sidelink data transmission in the first candidate resource set to obtain the first candidate resource subset) is less than that used in performing resource exclusion on the second candidate resource set (i.e., determining the candidate resources available for sidelink data transmission in the second candidate resource set to obtain the second candidate resource subset). For example, during the resource exclusion process of $S_{A1}$, the RSRP threshold may be offset by −3 dB or −ndB relative to the threshold used by $S_{A2}$, which is beneficial to increasing reliability of initial transmission to some extent.

For another example, a value of a transmission priority used in performing resource exclusion on the first candidate resource set (i.e., determining the candidate resources available for sidelink data transmission in the first candidate resource set to obtain the first candidate resource subset) is less than that used in performing resource exclusion on the second candidate resource set (i.e., determining the candidate resources available for sidelink data transmission in the second candidate resource set to obtain the second candidate resource subset). For example, the value $prio_{TX}$ of the transmission priority of $S_{A1}$ is less than an actual transmission priority, that is, $S_{A1}$ is less than an actual transmission priority notified by the MAC that is used by $S_{A2}$, meaning that the priority is higher.

For another example, a reporting portion (X %) for first candidate resource sets with identical priorities is greater than a value to which the second candidate resource set corresponds.

In the embodiment of this disclosure, in 503, after receiving the two candidate resource subsets reported by the physical layer, the higher layer of the first terminal equipment may select resources for transmitting sidelink data for a certain number (first predetermined number) times from the subset of the first candidate resource set (the first candidate resource subset), and select resources for transmitting sidelink data for a remaining number (second predetermined number) times from the subset of the second candidate resource set (the second candidate resource subset). Here, the remaining number of times refers to a target number of times minus the first predetermined number. The target number of times is determined by the MAC layer according to a parameter range configured by RRC and a channel busy ratio (CBR) of a current resource pool.

For example, the relevant process of resource selection in TS 38.321 of 3 GPP may be modified as follows:

---

3>    randomly select the time and frequency resources for one
transmission opportunity from the resource set $S_{A1}$ indicated
by the physical layer as specified in clause 8.1.4 of TS 38.214 [7],
according to the amount of selected frequency resources and the remaining
PDB of SL data available in the logical channel(s) allowed on the carrier;
3>    if one or more HARQ retransmissions are selected:
       5> randomly select the time and frequency resources for one or
       more transmission opportunities from the available resources of
       resource set $S_{A2}$, according to the amount of selected
       frequency resources,

---

In some embodiments, the number of transmission resources selected by the first terminal equipment in the first candidate resource subset may be predefined, or may be determined by a total number of selected times of transmission and/or a time length of an SL DRX active time of the second terminal equipment in a PDB to which the transport block (TB) corresponds or a ratio of the time length to a total length, and it may also be determined by taking a data packet priority and/or a result of measuring a channel busy ratio (CBR) into account, wherein the higher the data packet priority, the more resources needing to be selected in the subset of the first candidate resource set (the first candidate resource subset), and the more times of transmission; the larger the CBR, the fewer resources needing to be selected in the subset of the first candidate resource set (the first candidate resource subset), and the fewer times of transmission. The above is just an example, and specifically, the number of transmission resources selected by the first terminal equipment in the first candidate resource subset may be determined according to at least one of the above factors, or may be determined according to other factors or a combination of other factors, and this disclosure is not limited thereto.

For example, the total number of times of transmission and the active time length or active time ratio may be obtained by looking up a table to obtain a corresponding number of times of transmission by using resources contained in the first candidate resource subset, that is, a value of each total number of times of transmission and each active time length or an active time ratio correspond to a value of the number of times of transmission by using the resources contained in the first candidate resource subset.

In the embodiment of this disclosure, in some embodiments, the higher layer of the first terminal equipment may further notify its physical layer of a parameter indicating the SL DRX configuration of the second terminal equipment, wherein the parameter may be one or more, and may indicate the SL DRX configuration of the second terminal equipment or may indicate the SL DRX configuration of the second terminal equipment to some extent.

In the above embodiment, the physical layer of the first terminal equipment receives a parameter indicating the sidelink discontinuous reception configuration of the second terminal equipment notified by the higher layer of the first terminal equipment.

For example, the parameter may include an operating period, an offset and a size of drx-OnDurationTimer (discontinuous reception duration timer) on the sidelink, and a size of a timer, such as drx-Inactivity Timer (discontinuous reception inactivity timer) on the sidelink, drx-HARQ-RTT-Timer (discontinuous reception hybrid automatic repeat request round-trip time timer) on the sidelink, and drx-RetransmissionTimer (discontinuous reception retransmission timer) on the sidelink, etc.; or, the parameter may only include information related to drx-OnDurationTimer on the sidelink (such as an operating period, an offset and an size). The above is an example only, and the parameter may include any combination of information related to the timers on the sidelink.

In the embodiment of this disclosure, the timers on the sidelink may be configured for unicast, that is, the timers are unicast-specific, and include an operating period, a size and an offset; and/or, the timers on the sidelink may also be configured common timers, that is, no matter whether a transmission mode is a unicast transmission mode, or a multicast transmission mode, or a broadcast transmission mode, configuration of the timers on the sidelink is common.

In the embodiment of this disclosure, the higher layer of the first terminal equipment may further transmit indication information indicating a type of the second terminal equipment to the physical layer, and/or transmit indication information indicating a type of transmission of a current service to the physical layer.

In the above embodiment, the physical layer of the first terminal equipment receives indication information indicating the equipment type of the second terminal equipment, and/or indication information indicating a cast type of the current service, transmitted by the higher layer of the first terminal equipment.

The above equipment type is, for example, a V-UE or a P-UE, that is, whether the second terminal equipment is a V-UE or a P-UE is indicated by the indication information indicating the equipment type of the second terminal equipment.

The above cast type is, for example, unicast, or groupcast, or broadcast, and whether the cast type of the current service is unicast, or multicast, or broadcast is indicated by the indication information indicating the cast type of the current service.

In the embodiment of this disclosure, in some embodiments, if the first terminal equipment is configured with partial sensing, the above overlapping refers to overlapping of the continuous SL DRX active time and a candidate slot set selected by the physical layer of the first terminal equipment in the selection window of the first terminal equipment. This is because that for the first terminal equipment configured with the partial sensing, candidate resources it may select are limited to the candidate resource set selected by the physical layer in the selection window of the first terminal equipment.

Figure 8:
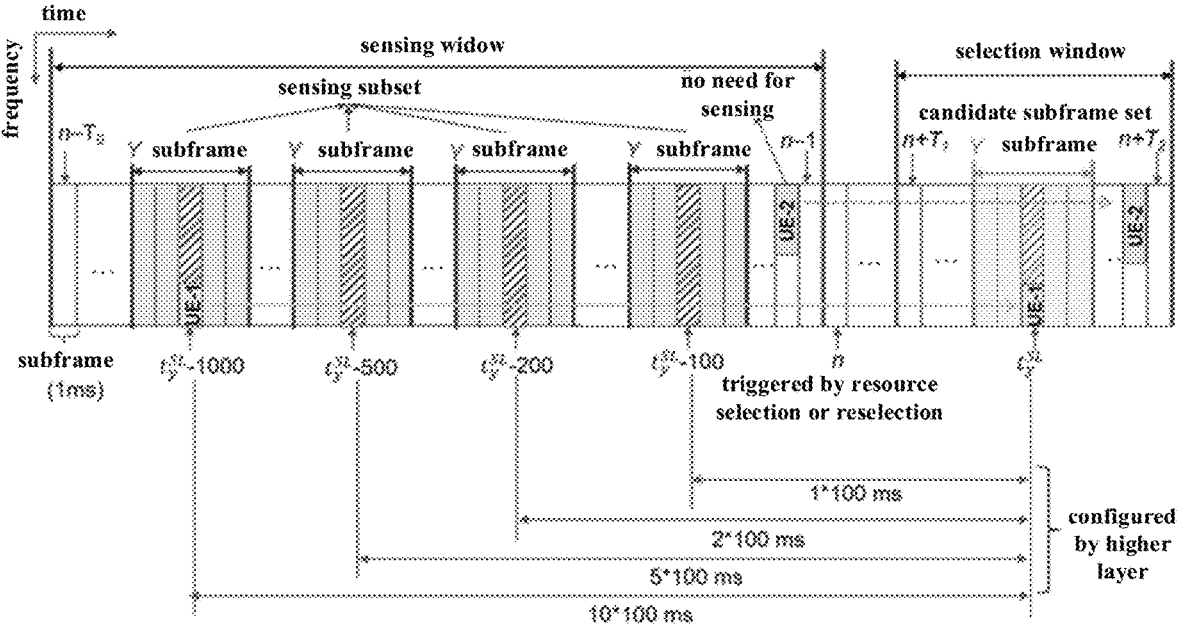
FIG. 8 is a schematic diagram of an example of partial sensing.

FIG. 8 is a schematic diagram of an example of the partial sensing. As shown in FIG. 8, if the first terminal equipment is configured with the partial sensing, slots corresponding to sensed slots in a sensing window may only be selected in the selection window and taken as slots where the candidate resources are located.

In the embodiment of this disclosure, if current resource selection is for a plurality of MAC PDUs (periodic services), the above resource selection process only limits resource selection for initial transmission and retransmission within a first period, and there is no need to limit initial transmission and retransmission of subsequent periods. For example, SCI may indicate to reserve the initial transmission and retransmission for subsequent periods.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that by generating two candidate resource sets and executing an independent resource exclusion process, two candidate resource subsets may be obtained and reported, which may ensure that the MAC layer has sufficient candidate resources in the subset of the candidate resource set for random selection, may ensure that the transmission resources for initial transmission selected by the transmitting device overlap with the SL DRX active time of the receiving device as possible, and may reduce power consumption of the receiving device as much as possible.

Embodiment of a Second Aspect

The embodiment of this disclosure provides a resource selection method, which shall be described from a side of a first terminal equipment. The first terminal equipment may transmit sidelink data to a second terminal equipment, and the second terminal equipment is configured with SL DRX. Here, the SL DRX configuration may be configured by a network device for the second terminal equipment, or may be preconfigured, or may be configured by the first terminal equipment for the second terminal equipment, or may be configured by the second terminal equipment for itself according to a demand of its own for power saving. In addition, from the perspective of sidelink data transmission, the first terminal equipment in the embodiment of this disclosure is a transmitting device, and the second terminal equipment is a receiving device.

The embodiment of the second aspect may be implemented in combination with the embodiment of the first aspect, or may be implemented independently, and contents identical to those in the embodiment of the first aspect shall not be described herein any further.

Figure 9:
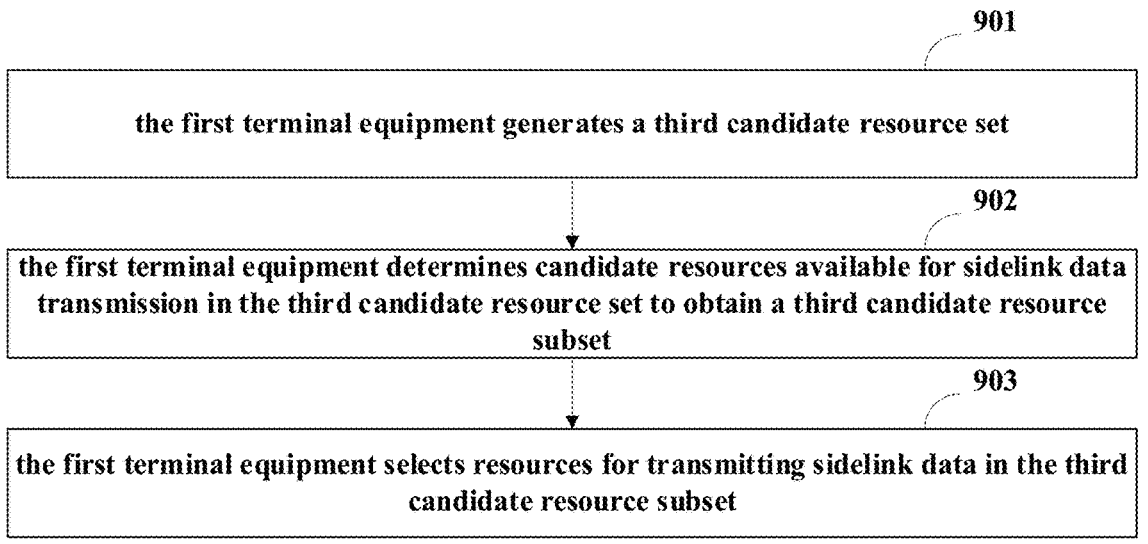
FIG. 9 is a schematic diagram of the resource selection method of an embodiment of this disclosure.

FIG. 9 is a schematic diagram of the resource selection method of the embodiment of this disclosure. As shown in FIG. 9, the method includes:

901: the first terminal equipment generates a third candidate resource set;

902: the first terminal equipment determines candidate resources available for sidelink data transmission in the third candidate resource set to obtain a third candidate resource subset; and

903: the first terminal equipment selects resources for transmitting sidelink data in the third candidate resource subset, wherein the third candidate resource subset includes candidate resources in the selection window of the first terminal equipment other than all candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts.

It should be noted that FIG. 9 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 9.

In the embodiment of this disclosure, within the selection window of the transmitting device, all candidate resources before a starting time of a first slot where the selection window of the transmitting device overlaps with a first or next continuous SL DRX active time of the receiving device during this period are excluded, thereby preventing the transmitting device from selecting resources before the first slot where the selection window of the transmitting device overlaps with the next continuous SL DRX active time of the receiving device. This is because that such resources overlap with a non-active time of the receiving device, and are unable to be indicated by previous SCI to be reserved or are within a dynamic active period triggered by the SCI. Hence, such resources are within an SL DRX non-active period of the receiving device, and performing transmission by using such resources may cause the receiving device to be unable to normally receive and decode data packets transmitted by the transmitting device.

In the embodiment of this disclosure, within the time overlapping the continuous SL DRX active time of the second terminal equipment, the retransmission mode of the first terminal equipment is blind retransmission, and the retransmission mode for the remaining time is retransmission based on HARQ-ACK. Here, the transmission resources used by the first terminal equipment during the continuous active SL DRX active time of the second terminal equipment include but are not limited to resources selected from available candidate resource subset of the first candidate resource set.

Figure 10:
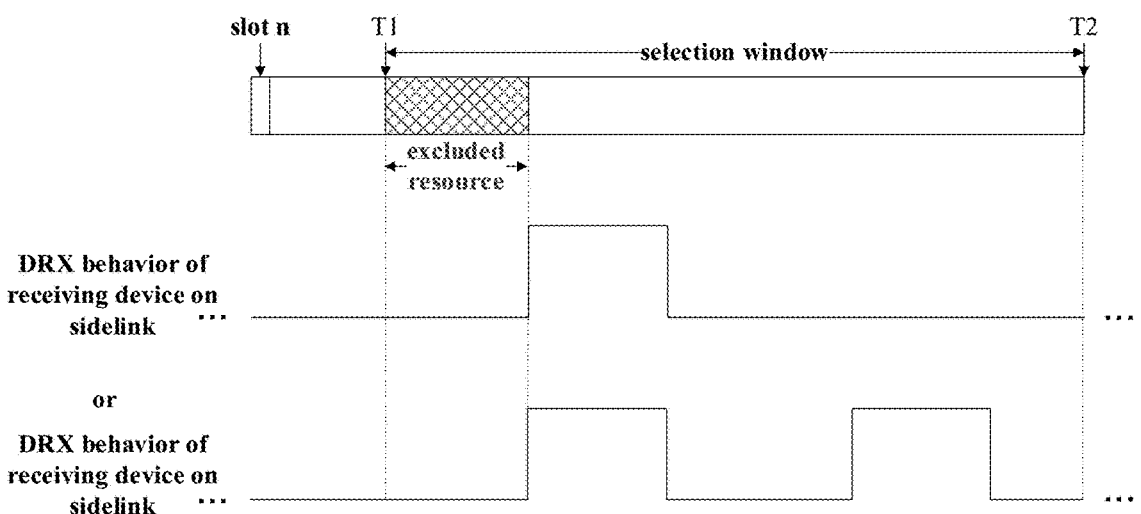
FIG. 10 is a schematic diagram of positions of excluded resources.

In some embodiments, the third candidate resource set or the third candidate resource subset may be made in a resource exclusion manner not include the above resources (all candidate resources within the selection window of the first terminal equipment before the first slot where the selection window of the first terminal equipment overlaps with the first or next continuous SL DRX active time of the second terminal equipment during the selection window), i.e., all candidate resources within the selection window of the transmitting device before the first slot where the selection window of the first terminal equipment overlaps with the first or next continuous SL DRX active time of the second terminal equipment during the selection window need to be excluded. FIG. 10 is a schematic diagram of positions of these excluded resources.

Figure 11:
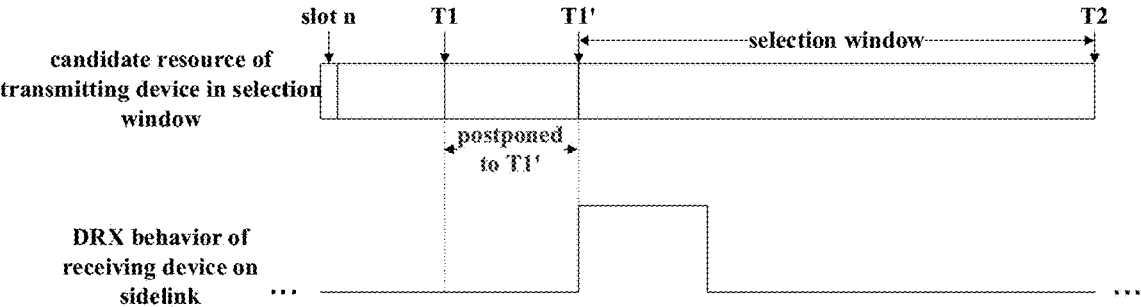
FIG. 11 is a schematic diagram of a starting position of a selection window of the first terminal equipment after being postponed.

In the above embodiment, the above resources may be excluded when the third candidate resource set is generated (operation 901), that is, the third candidate resource set generated by the first terminal equipment does not include the above candidate resources, or the above resources may also be excluded when the third candidate resource subset is a specific time-domain position after the postponing is the starting time of the first slot where the selection window of the first terminal equipment overlaps with the first or next continuous SL DRX active time of the second terminal equipment during the selection window. FIG. 11 shows a case where the starting position of the selection window of the first terminal equipment after being postponed. As shown in FIG. 11, the starting position of the selection window is postponed from T1 to T1'.

In some embodiments, control of the starting time of the selection window may also be implemented by the MAC layer of the first terminal equipment. For example, for the physical layer of the first terminal equipment, the higher layer of the first terminal equipment delays a notification on parameters related to resource selection of the third candidate resource set to a predefined time before the first slot of the next continuous SL DRX active time of the second terminal equipment at a current time. Optionally, the predefined time is T1 or $$T_{proc,1}^{SL}.$$

For example, the relevant process of resource selection in TS 38.321 of 3 GPP may be modified as follows:

3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PSSCH-TxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> If SL DRX is configured for a peer UE, postpone to notify the resource selection related parameters to physical layer until $\left(T1 \text{ or } T_{proc,1}^{SL} \text{ before}\right)$ the next starting of $Rx\ UR's$ OnDuration timer running.

3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier;

determined (operation 902), that is, the first terminal equipment excludes all candidate resources before the predetermined time unit from the third candidate resource set or the third candidate resource subset, and this disclosure is not limited thereto.

In some embodiments, by postponing the starting time of the selection window of the first terminal equipment, the third candidate resource set or the third candidate resource subset may be made not include the above resources (all candidate resources within the selection window of the first terminal equipment before the first slot where the selection window of the first terminal equipment overlaps with the first or next continuous SL DRX active time of the second terminal equipment during the selection window), that is, the first terminal equipment postpones a time-domain position of the starting time of the selection window to the starting time of the above predetermined time unit (i.e., the first slot where the selection window of the first terminal equipment overlaps with the first or next continuous SL DRX active time of the second terminal equipment during the selection window period).

For example, the physical layer of the first terminal equipment instructs the starting time T1 of the selection window of the first terminal equipment to be postponed, and In the embodiment of this disclosure, if the number of slots where the selection window of the first terminal equipment overlaps with the first continuous SL DRX active time during the selection window or the next continuous SL DRX active time after the selection window starts of the second terminal equipment is less than a predetermined threshold, a first slot where the selection window of the first terminal equipment overlaps with an even next continuous SL DRX active time of the second terminal equipment after the selection window starts is taken as the above predetermined time unit. That is, if the number of slots of the first continuous SL DRX active time overlapping with the selection window is less than the predetermined threshold, all candidate resources within slots where the selection window of the first terminal equipment overlapping with the first continuous SL DRX active time need to be excluded, or the physical layer or MAC layer causes the selection window to be postponed to start at a starting symbol of a second continuous SL DRX active time overlapping with the selection window. Likewise, if the number of slots of the second continuous SL DRX active time overlapping with the selection window is still less than the predetermined threshold, all candidate resources within the overlapped slots are continued to be excluded or the selection window is postponed, and so on, until the above conditions are satisfied.

Figure 12:
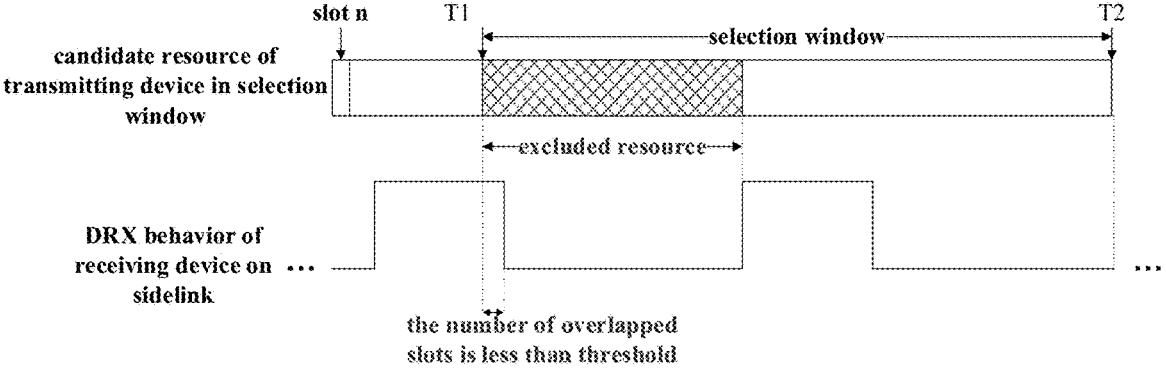
FIG. 12 is a schematic diagram of a case where a continuous SL DRX active time of the receiving device overlaps with a selection window of the transmitting device.

FIG. 12 is a schematic diagram of a case where the continuous SL DRX active time of the receiving device overlaps with the selection window of the transmitting device. As shown in FIG. 12, as the number of overlapped slots of the first continuous SL DRX active time overlapping with the selection window is less than the predetermined threshold, candidate resources before a first slot of the second continuous SL DRX active time overlapping with the selection window are excluded from the third candidate resource set or the third candidate resource subset.

FIG. 13 is another schematic diagram of the case where the continuous SL DRX active time of the receiving device overlaps with the selection window of the transmitting device. As shown in FIG. 13, as the number of overlapped slots of the first continuous SL DRX active time overlapping with the selection window is less than the predetermined threshold, the starting time of the selection window is postponed to T1', thereby excluding candidate resources before a first slot of the second continuous SL DRX active time overlapping with the original selection window.

In the embodiment of this disclosure, similar to the embodiment of the first aspect, the continuous SL DRX active time of the second terminal equipment during the selection window of the first terminal equipment is at least one continuous slot, the at least one continuous slot being an operating period of a discontinuous reception duration timer (drx-OnDurationTimer) on a sidelink of the second terminal equipment, or an operating period of a discontinuous reception inactivity timer (drx-InactivityTimer) on a sidelink of the second terminal equipment, or an operating period of a discontinuous reception retransmission timer (drx-RetransmissionTimer) on the sidelink of the second terminal equipment, or a combination of operating periods of timers on one or more sidelinks in the timers on the above three sidelinks, that is, the above active time of the second terminal equipment during the selection window of the first terminal equipment may be one or more operating periods of the timers on the above three sidelinks.

It should be noted that the names of the timers on the above sidelinks are examples only, this disclosure is not limited thereto, and the timers on the above three sidelinks may also use other names.

In the embodiment of this disclosure, similar to the embodiment of the first aspect, the timers on the sidelink may be configured for unicast, that is, the timers are unicast-specific, and include an operating period, a size and an offset; and/or, the timers on the sidelink may also be timers on configured common sidelinks, that is, no matter whether a transmission mode is a unicast transmission mode, or a multicast transmission mode, or a broadcast transmission mode, configuration of the timers on the sidelink is common.

In the embodiment of this disclosure, similar to the embodiment of the first aspect, in some embodiments, if the first terminal equipment is configured with partial sensing, the above overlapping refers to overlapping of the continuous SL DRX active time and a candidate slot set selected by the physical layer of the first terminal equipment in the selection window of the first terminal equipment. This is because that for the first terminal equipment configured with the partial sensing, candidate resources it may select are limited to the candidate resource set selected by the physical layer in the selection window of the first terminal equipment.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the transmitting device is limited in selecting resources before the first slot where the selection window of the transmitting device overlaps with the next continuous SL DRX active time of the receiving device.

Embodiment of a Third Aspect

The embodiment of this disclosure provides a resource selection method, which shall be described from a side of a first terminal equipment. The first terminal equipment may transmit sidelink data to a second terminal equipment, and the second terminal equipment is configured with SL DRX. Here, the SL DRX configuration may be configured by a network device for the second terminal equipment, or may be preconfigured, or may be configured by the first terminal equipment for the second terminal equipment, or may be configured by the second terminal equipment for itself according to a demand of its own for power saving; however, this disclosure in not limited thereto. In addition, from the perspective of sidelink data transmission, the first terminal equipment in the embodiment of this disclosure is a transmitting device, and the second terminal equipment is a receiving device.

The embodiment of the third aspect may be implemented in combination with the embodiment of the first aspect, or may be implemented independently, and contents identical to those in the embodiment of the first aspect shall not be described herein any further.

FIG. 14 is a schematic diagram of the resource selection method of the embodiment of this disclosure. As shown in FIG. 14, the method includes:

1401: the first terminal equipment selects transmission resources for transmitting sidelink data in a candidate resource subset, wherein, the first terminal equipment first selects one transmission resource in the candidate resource subset, the one transmission resource being selected in candidate resources of an overlapped time period of a selection window of the first terminal equipment and a continuous SL DRX active time of the second terminal equipment during the selection window;

and the first terminal equipment selects remaining transmission resources in the candidate resource subset other than candidate resources before a predetermined time unit of the selection window of the first terminal equipment, the predetermined time unit referring to an overlapped first slot of the period of the selection window of the first terminal equipment and a continuous SL DRX active time of the second terminal equipment where the first selected transmission resource is present.

In the embodiment of this disclosure, when the selection window of the transmitting device overlaps with more than one continuous SL DRX active time of the receiving device, the MAC layer of the transmitting device first selects one candidate resource in the candidate resource subset reported by the physical layer during a time period when the selection window of the transmitting device overlaps with the continuous SL DRX active time of the receiving device during this period, and then selects transmission resources for the remaining number of times of transmission, but the selected transmission resources should not be before a first slot where the selection window of the transmitting device overlaps with a continuous SL DRX active time of the receiving device where a first-selected transmission resource during this period is located. Hence, similar to the embodiment of the second aspect, the transmitting device is limited in selecting resources before the first slot of the next continuous SL DRX active time of the receiving device.

In the embodiment of this disclosure, within the time overlapping the continuous SL DRX active time of the second terminal equipment, a retransmission mode of the first terminal equipment is blind retransmission, and a retransmission mode within the remaining time is retransmission based on HARQ-ACK. Here, the transmission resources used by the first terminal within the continuous SL DRX active time of the second terminal equipment include but not limited to resources selected from an available candidate resource subset of the first candidate resource set.

Figure 15:
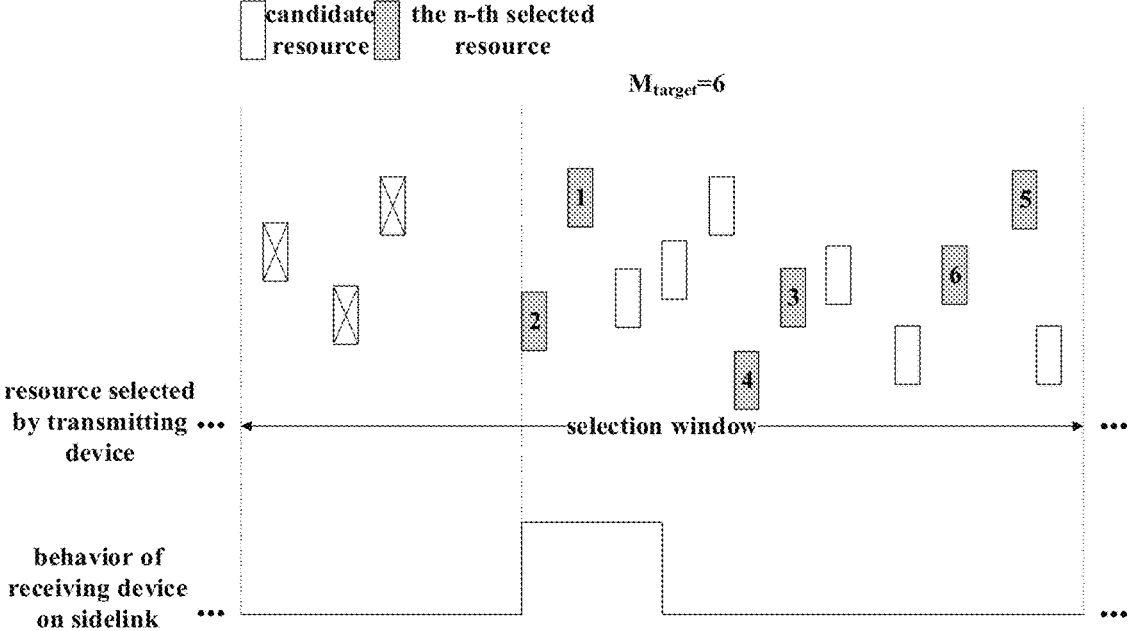
FIG. 15 is a schematic diagram of an example of performing resource selection according to the resource selection method of the embodiment of this disclosure.

FIG. 15 is a schematic diagram of an example of performing resource selection according to the resource selection method of the embodiment of this disclosure. As shown in FIG. 15, the transmitting device selects one first transmission resource at the continuous SL DRX active time of the receiving device overlapping the selection window, and then selects transmission resources for other times of transmission from candidate resources other than those before the first slot of the continuous SL DRX active time, thereby avoiding selecting transmission resources before activating the receiving device.

In some embodiments, the above candidate resource subset includes a first candidate resource subset and a second candidate resource subset, the first candidate resource subset being a candidate resource set available for sidelink data transmission in a first candidate resource set, the first candidate resource set being a set of all candidate resources within an overlapped time period of a selection window of the first terminal equipment and at least one continuous SL DRX active time of the second terminal equipment during the selection window, and the second candidate resource subset being a candidate resource set available for sidelink data transmission in a second candidate resource set, the second candidate resource set being a set of remaining candidate resources within the selection window of the first terminal equipment other than candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts; and the first terminal equipment selects the one transmission resource in the first candidate resource subset, and selects the remaining transmission resources in the second candidate resource subset.

For example, corresponding to the case where the selection window of the transmitting device overlaps with more than one continuous SL DRX active time of the receiving device (in such a case, the physical layer reports subsets (the first candidate resource subset and the second candidate resource subset) of two candidate resource sets, the first candidate resource subset corresponding to all more than one continuous SL DRX active time of the receiving UE that overlaps with the selection window of the transmitting device), in such a case, the one candidate resource in the first candidate resource subset is selected, and resources corresponding to the remaining number of times of transmission in the second candidate resource subset are selected.

In some embodiments, the first terminal equipment selects the one transmission resource from the candidate resources in the time period where the selection window of the first terminal equipment overlaps with the first continuous SL DRX active time of the second terminal equipment during the selection window period; and if the above candidate resource set does not include the above candidate resource, the first terminal equipment selects the one transmission resource from the candidate resources in the time period where the selection window of the first terminal equipment overlaps with the next continuous SL DRX active time of the second terminal equipment during the selection window, until the one transmission resource is selected.

For example, the MAC layer of the transmitting device may preferentially select candidate resources within the time period where the selection window of the transmitting device overlaps with the first continuous SL DRX active time of the receiving device during this period; and if the candidate resource set reported by the physical layer does not contain such candidate resources, the transmitting device selects candidate resources within a time period that overlaps with a second continuous SL DRX active time, and so on.

In the embodiment of this disclosure, similar to the embodiment of the second aspect, if the number of overlapped slots of the selection window of the first terminal equipment and a first continuous SL DRX active time of the second terminal equipment during the selection window or a next continuous SL DRX active time of the second terminal equipment after the selection window starts is less than a predetermined threshold, an overlapped first slot of the selection window of the first terminal equipment and a further next SL DRX active time of the second terminal equipment after the selection window starts is taken as the predetermined time unit. And if the number of overlapped slots of the selection window and the further next continuous SL DRX active time is still less than the predetermined threshold, the above operations are repeated, until the number of overlapped slots is greater than or equal to the predetermined threshold.

In the embodiment of this disclosure, the above one transmission resource may be a resource used in initial transmission of sidelink data; however, this disclosure is not limited thereto, and as shown in FIG. 15, the above one transmission resource may also not be a resource used in initial transmission of sidelink data.

In the embodiment of this disclosure, similar to the embodiment of the first aspect, the continuous SL DRX active time of the second terminal equipment during the selection window of the first terminal equipment is at least one continuous slot, the at least one continuous slot being an operating period of a discontinuous reception duration timer (drx-OnDurationTimer) on a sidelink of the second terminal equipment, or an operating period of a discontinuous reception inactivity timer (drx-InactivityTimer) on a sidelink of the second terminal equipment, or an operating period of a discontinuous reception retransmission timer (drx-RetransmissionTimer) on the sidelink of the second terminal equipment, or a combination of operating periods of timers on one or more sidelinks in the timers on the above three sidelinks, that is, the above active time of the second terminal equipment during the selection window of the first terminal equipment may be one or more operating periods of the timers on the above three sidelinks. It should be noted that the names of the timers on the above sidelinks are examples only, this disclosure is not limited thereto, and the timers on the above three sidelinks may also use other names.

In the embodiment of this disclosure, similar to the embodiment of the first aspect, the timers on the sidelink may be configured for unicast, that is, the timers are unicast-specific, and include an operating period, a size and an offset; and/or, the timers on the sidelink may also be timers on configured common sidelinks, that is, no matter whether a transmission mode is a unicast transmission mode, or a multicast transmission mode, or a broadcast transmission mode, configuration of the timers on the sidelink is common.

In the embodiment of this disclosure, similar to the embodiment of the first aspect, in some embodiments, if the first terminal equipment is configured with partial sensing, the above overlapping refers to overlapping of the continuous SL DRX active time and a candidate slot set selected by the physical layer of the first terminal equipment in the selection window of the first terminal equipment. This is because that for the first terminal equipment configured with the partial sensing, candidate resources it may select are limited to the candidate resource set selected by the physical layer in the selection window of the first terminal equipment.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the transmitting device is limited in selecting resources before the first slot where the selection window of the transmitting device overlaps with the next continuous SL DRX active time of the receiving device.

Embodiment of a Fourth Aspect

The embodiment of this disclosure provides a resource selection method, which shall be described from a side of a second terminal equipment. A first terminal equipment may transmit sidelink data to the second terminal equipment, and the second terminal equipment is configured with SL DRX. Here, the SL DRX configuration may be configured by a network device for the second terminal equipment, or may be preconfigured, or may be configured by the first terminal equipment for the second terminal equipment, or may be configured by the second terminal equipment for itself according to a demand of its own for power saving; however, this disclosure is not limited thereto. In addition, from the perspective of sidelink data transmission, the first terminal equipment in the embodiment of this disclosure is a transmitting device, and the second terminal equipment is a receiving device.

The embodiment of the fourth aspect is processing at a side of the second terminal equipment, and contents therein identical those in the embodiments of the first to the third aspects shall not be described herein any further.

Figure 16:
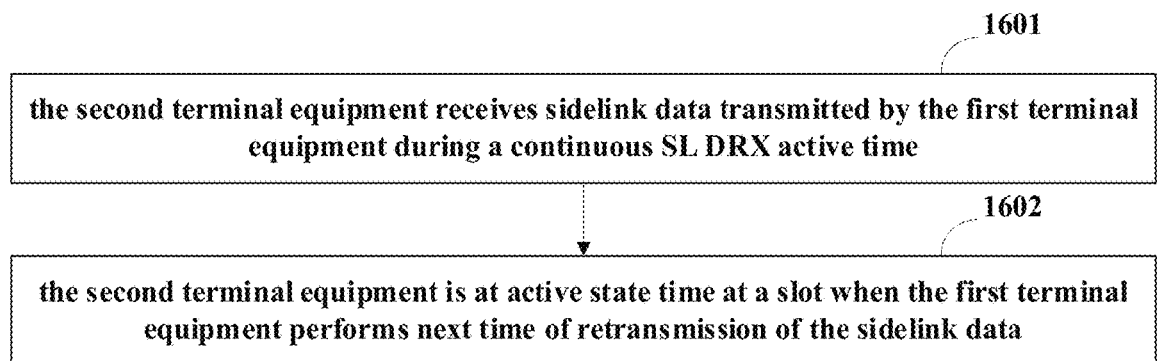
FIG. 16 is a schematic diagram of a data transmission method of an embodiment of this disclosure.

FIG. 16 is a schematic diagram of the resource selection method of the embodiment of this disclosure. As shown in FIG. 16, the method includes:

1601: the second terminal equipment receives sidelink data transmitted by the first terminal equipment during a continuous SL DRX active time; and 1602: the second terminal equipment is at active state time at a slot when the first terminal equipment performs next time of retransmission of the sidelink data.

In the embodiment of this disclosure, during its continuous SL DRX active time, the receiving device receives a first time of transmission of a PSSCH by the transmitting device. Via an indication in its corresponding PSCCH or a timer on a sidelink triggered to run by the PSCCH, the receiving device may be at "an active time" at the slot when the transmitting device performs next time of retransmission, and subsequent retransmissions may be indicated by a PSCCH to which a next time of retransmission corresponds, or the timer on the running sidelink is triggered to ensure that the receiving device is at the "active time", and so on.

The embodiment of this disclosure ensures by the enhanced resource selection mechanism of the transmitting device that when the receiving device is configured with SL DRX, the receiving device is able to transmit data packets during the continuous SL DRX active time of the receiving device, thereby avoiding a case where the data packets are unable to be received and decoded due to the receiving device being in a "non-active" state, and ensuring reliability of transmission of data packets.

Embodiment of a Fifth Aspect

The embodiment of this disclosure provides a resource selection apparatus.

FIG. 17 is a schematic diagram of the resource selection apparatus of the embodiment of this disclosure. The apparatus may be, for example, a terminal equipment (such as the first terminal equipment described above), or may be one or more components or assemblies configured in the terminal equipment, with contents identical to those in the embodiment of the first aspect being not going to be described herein any further.

As shown in FIG. 17, a resource selection apparatus 1700 includes a generating unit 1701, a determining unit 1702 and a selecting unit 1703.

In some embodiments, the generating unit 1701 generates a first candidate resource set and a second candidate resource set, the first candidate resource set being a set of all candidate resources within an overlapped time period of a selection window of the first terminal equipment and at least one continuous SL DRX active time of the second terminal equipment during the selection window, the determining unit 1702 respectively determines candidate resources in the first candidate resource set available for sidelink data transmission and candidate resources in the second candidate resource set available for sidelink data transmission to obtain a first candidate resource subset and a second candidate resource subset, and the selecting unit 1703 selects resources for transmitting a first predetermined number of times of transmission of sidelink data in the first candidate resource subset, and select resources for transmitting a remained number of times of transmission of sidelink data in the second candidate resource subset.

In some embodiments, the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

In some embodiments, the first candidate resource set is one of the following:

a set of all candidate resources within an overlapped time period of the selection window of the first terminal equipment and all continuous SL DRX active time of the second terminal equipment during the selection window; or a set of all candidate resources within an overlapped time period of the selection window of the first terminal equipment and a first continuous SL DRX active time of the second terminal equipment during the selection window or a next continuous SL DRX active time of the second terminal equipment after the selection window starts.

In some embodiments, the first candidate resource set is one of the following:

a set of all candidate resources within a first sub-selection window of the selection window of the first terminal equipment; or a set of all candidate resources within all sub-selection windows of the selection window of the first terminal equipment, wherein the sub-selection window refers to a time period when the selection window of the first terminal equipment overlaps with the continuous SL DRX active time of the second terminal equipment during the selection window.

In some embodiments, the second candidate resource set is one of the following:

a set of remaining candidate resources within the selection window of the first terminal equipment other than the first candidate resource set;

a set of all candidate resources within the selection window of the first terminal equipment;

a set of remaining candidate resources within the selection window of the first terminal equipment other than the first candidate resource set and candidate resources before a predetermined time unit within the selection window of the first terminal equipment; or a set of remaining candidate resources within the selection window of the first terminal equipment other than candidate resources before a predetermined time unit, wherein the predetermined time unit refers to an overlapped first slot of the selection window of the first terminal equipment and a first continuous SL DRX active time of the second terminal equipment during the selection window or a next continuous SL DRX active time of the second terminal equipment after the selection window starts.

In some embodiments, an RSRP threshold used by the determining unit in determining the first candidate resource subset is less than an RSRP threshold used thereby in determining the second candidate resource subset; and/or, a value of a transmission priority used by the determining unit in determining the first candidate resource subset is less than a value of a transmission priority used thereby in determining the second candidate resource subset; and/or, a reporting proportion for first candidate resource sets with identical priorities determined by the determining unit is greater than or less than a value to which the second candidate resource set corresponds.

In some embodiments, as shown in FIG. 17, the resource selection apparatus 1700 further includes:

a first receiving unit 1704 configured to, at a physical layer of the first terminal equipment, receive a transmission parameter for the first candidate resource set and a transmission parameter for the second candidate resource set notified by a higher layer of the first terminal equipment, wherein a value of a transmission priority in the transmission parameter for the first candidate resource set is less than a value of a transmission priority in the transmission parameter for the second candidate resource set, and/or, the number of sub-channels for transmission of sidelink data in a slot in the transmission parameter for the first candidate resource set is greater than or less than the number of sub-channels for transmission of sidelink data in a slot in the transmission parameter for the second candidate resource set.

In some embodiments, as shown in FIG. 17, the resource selection apparatus 1700 further includes:

a second receiving unit 1705 configured to, at the physical layer of the first terminal equipment, receive a parameter for indicating discontinuous reception configuration of the second terminal equipment, notified by a higher layer of the first terminal equipment, the parameter including at least one of the following:

an operating period, an offset and a size of the discontinuous reception duration timer (drx-OnDurationTimer) on the sidelink;

a size of the discontinuous reception inactivity timer (drx-InactivityTimer) on the sidelink;

a size of a discontinuous reception hybrid automatic retransmission round-trip time timer (drx-HARQ-RTT-Timer) on the sidelink; or a size of the discontinuous reception retransmission timer (drx-RetransmissionTimer) on the sidelink.

In some embodiments, running of the timer on the sidelink is unicast-specific or common.

In some embodiments, as shown in FIG. 17, the resource selection apparatus 1700 further includes:

a third receiving unit 1706 configured to, at the physical layer of the first terminal equipment, receive indication information for indicating an equipment type of the second terminal equipment, and/or indication information for indicating a cast type of a current service, transmitted by a higher layer of the first terminal equipment.

In some embodiments, the number of transmission resources selected by the selecting unit 1703 in the first candidate resource subset is predefined, or determined by at least one of the following factors:

a total number of times of transmission of the sidelink data and/or a length of a time of the second terminal equipment in a discontinuous reception active state in a PDB to which a current transport block corresponds or a ratio of the length to a total length;

a priority of packets of the sidelink data; or a measured channel busy ratio (CBR) result.

In some embodiments, the first terminal equipment is configured with partial sensing, and the overlapping refers to overlapping of the continuous SL DRX active time and a candidate slot set selected by the physical layer of the first terminal equipment in the selection window of the first terminal equipment.

FIG. 18 is another schematic diagram of the resource selection apparatus of the embodiment of this disclosure. The apparatus may be, for example, a terminal equipment (such as the first terminal equipment described above), or may be one or more components or assemblies configured in the terminal equipment, with contents identical to those in the embodiment of the second aspect being not going to be described herein any further.

As shown in FIG. 18, a resource selection apparatus 1800 includes a generating unit 1801, a determining unit 1802 and a selecting unit 1803.

The generating unit 1801 generates a third candidate resource set, the determining unit 1802 determines candidate resources available for sidelink data transmission in the third candidate resource set, and the selecting unit 1803 selects resources for transmitting sidelink data from candidate resources in the third candidate resource set available for transmission of sidelink data to obtain a third candidate resource subset, wherein the third candidate resource subset includes candidate resources in the selection window of the first terminal equipment other than all candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts.

In some embodiments, the third candidate resource set generated by the generating unit does not include all candidate resources in the selection window of the first terminal equipment before the predetermined time unit, or the first terminal equipment excludes all candidate resources before the predetermined time unit.

In some embodiments, the generating unit 1801 postpones a time domain position of a starting time of the selection window to the predetermined time unit.

In some embodiments, as shown in FIG. 18, the resource selection apparatus 1800 further includes:

a transmitting unit 1804 configured to, from a higher layer of the first terminal equipment to a physical layer of the first terminal device, delay a notification of parameters related to resource selection of the third candidate resource set to a predetermined time before a first slot of a next continuous SL DRX active time of a current time of the second terminal equipment.

In some embodiments, if the number of overlapped slots of the selection window of the first terminal equipment and a first continuous SL DRX active time of the second terminal equipment during the selection window or a next continuous SL DRX active time of the second terminal equipment after the selection window starts is less than a predetermined threshold, the selecting unit 1803 takes an overlapped first slot of the selection window of the first terminal equipment and a further next SL DRX active time of the second terminal equipment after the selection window starts as the predetermined time unit.

In some embodiments, the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

In some embodiments, running of the timer on the sidelink is unicast-specific or common.

In some embodiments, the first terminal equipment is configured with partial sensing, and the overlapping refers to overlapping of the continuous SL DRX active time and a candidate slot set selected by the physical layer of the first terminal equipment in the selection window of the first terminal equipment.

FIG. 19 is a further schematic diagram of the resource selection apparatus of the embodiment of this disclosure. The apparatus may be, for example, a terminal equipment (such as the first terminal equipment described above), or may be one or more components or assemblies configured in the terminal equipment, with contents identical to those in the embodiment of the third aspect being not going to be described herein any further.

As shown in FIG. 19, a resource selection apparatus 1900 includes a selecting unit 1901 configured to select transmission resources for transmitting sidelink data in a candidate resource subset, wherein the selecting unit 1901 first selects one transmission resource in the candidate resource subset, the one transmission resource being selected in candidate resources of an overlapped time period of a selection window of the first terminal equipment and a continuous SL DRX active time of the second terminal equipment during the selection window; and the selecting unit 1901 selects remaining transmission resources in the candidate resource subset other than candidate resources before a predetermined time unit of the selection window of the first terminal equipment, the predetermined time unit referring to an overlapped first slot of the period of the selection window of the first terminal equipment and a continuous SL DRX active time of the second terminal equipment where the first selected transmission resource is present.

In some embodiments, the candidate resource subset includes a first candidate resource subset and a second candidate resource subset, the first candidate resource subset being a candidate resource set available for sidelink data transmission in a first candidate resource set, the first candidate resource set being a set of all candidate resources within an overlapped time period of a selection window of the first terminal equipment and at least one continuous SL DRX active time of the second terminal equipment during the selection window, and the second candidate resource subset being a candidate resource set available for sidelink data transmission in a second candidate resource set, the second candidate resource set being a set of remaining candidate resources within the selection window of the first terminal equipment other than candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts; and the selecting unit 1901 selects the one transmission resource in the first candidate resource subset, and selects the remaining transmission resources in the second candidate resource subset.

In some embodiments, if the number of overlapped slots of the selection window of the first terminal equipment and a first continuous SL DRX active time of the second terminal equipment during the selection window or a next continuous SL DRX active time of the second terminal equipment after the selection window starts is less than a predetermined threshold, the selecting unit 1901 takes an overlapped first slot of the selection window of the first terminal equipment and a further next SL DRX active time of the second terminal equipment after the selection window starts as the predetermined time unit.

In some embodiments, the one transmission resource selected at the first time is a resource used in initial transmission of the sidelink data, or the one transmission resource selected at the first time is not a resource used in initial transmission of the sidelink data.

In some embodiments, the selecting unit 1901 selects the one transmission resource in candidate resources of an overlapped time period of the selection window of the first terminal equipment and a first continuous SL DRX active time of the second terminal equipment during the selection window; and if the candidate resources of the overlapped time period does not include the candidate resources, the selecting unit 1901 selects the one transmission resource in candidate resources of an overlapped time period of the selection window of the first terminal equipment and a next continuous SL DRX active time of the second terminal equipment during the selection window, until the one transmission resource is selected.

In some embodiments, the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

In some embodiments, running of the timer on the sidelink is unicast-specific or common.

In some embodiments, the first terminal equipment is configured with partial sensing, and the overlapping refers to overlapping of the continuous SL DRX active time and a candidate slot set selected by a physical layer in the selection window of the first terminal equipment.

The embodiment of this disclosure further provides a data transmission apparatus.

FIG. 20 is a schematic diagram of the data transmission apparatus of the embodiment of this disclosure. The apparatus may be, for example, a terminal equipment (such as the second terminal equipment described above), or may be one or more components or assemblies configured in the terminal equipment, with contents identical to those in the embodiment of the fourth aspect being not going to be described herein any further.

As shown in FIG. 20, a data transmission apparatus 2000 includes a receiving unit 2001 configured to receive sidelink data transmitted by the first terminal equipment during a continuous SL DRX active time of the second terminal equipment, wherein the second terminal equipment is at active time at a slot when the first terminal equipment performs next time of retransmission of the sidelink data.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the resource selection apparatus 1700/1800/1900 and the data transmission apparatus 2000 may further include other components or modules, and reference may be made to related techniques for particulars of these components or modules.

Furthermore, for the sake of simplicity, connection relationships between the components or modules or signal profiles thereof are only illustrated in FIGS. 17-20. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The embodiment of this disclosure ensures by the enhanced resource selection mechanism of the transmitting device that when the receiving device is configured with SL DRX, the transmitting device is able to transmit data packets during the continuous SL DRX active time of the receiving device, thereby avoiding a case where the data packets are unable to be received and decoded due to the receiving device being in a "non-active" state, and ensuring reliability of transmission of data packets.

Embodiment of a Sixth Aspect

The embodiment of this disclosure provides a communication system, and reference may be made to FIG. 3, with contents identical to those in the embodiments of the first to the fifth aspects being not going to be described herein any further.

In some embodiments, the communication system may at least include a first terminal equipment and a second terminal equipment, the first terminal equipment transmitting sidelink data to the second terminal equipment, and the second terminal equipment being configured with SL DRX, wherein, the first terminal equipment generates a first candidate resource set and a second candidate resource set, respectively determines candidate resources in the first candidate resource set available for sidelink data transmission and candidate resources in the second candidate resource set available for sidelink data transmission to obtain a first candidate resource subset and a second candidate resource subset, selects resources for transmitting a first predetermined number of times of transmission of sidelink data in the first candidate resource subset, and selects resources for transmitting a remained number of times of transmission of sidelink data in the second candidate resource subset, the first candidate resource set being a set of all candidate resources within an overlapped time period of a selection window of the first terminal equipment and at least one continuous SL DRX active time of the second terminal equipment during the selection window;

and the second terminal equipment receives the sidelink data at the configured continuous SL DRX active time.

In some embodiments, the communication system may at least include a first terminal equipment and a second terminal equipment, the first terminal equipment transmitting sidelink data to the second terminal equipment, and the second terminal equipment being configured with SL DRX, wherein, the first terminal equipment generates a third candidate resource set, determines candidate resources available for sidelink data transmission in the third candidate resource set to obtain a third candidate resource subset, and selects resources for transmitting sidelink data in the third candidate resource subset, wherein the third candidate resource subset includes candidate resources in the selection window of the first terminal equipment other than all candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts;

and the second terminal equipment receives the sidelink data at the configured continuous SL DRX active time.

In some embodiments, the communication system may at least include a first terminal equipment and a second terminal equipment, the first terminal equipment transmitting sidelink data to the second terminal equipment, and the second terminal equipment being configured with SL DRX, wherein, the first terminal equipment selects transmission resources for transmitting sidelink data in a candidate resource subset, wherein the first terminal equipment first selects one transmission resource in the candidate resource subset, the one transmission resource being selected in candidate resources of an overlapped time period of a selection window of the first terminal equipment and a continuous SL DRX active time of the second terminal equipment during the selection window; and the first terminal equipment selects remaining transmission resources in the candidate resource subset other than candidate resources before a predetermined time unit of the selection window of the first terminal equipment, the predetermined time unit referring to an overlapped first slot of the period of the selection window of the first terminal equipment and a continuous SL DRX active time of the second terminal equipment where the first selected transmission resource is present;

and the second terminal equipment receives the sidelink data at the configured continuous SL DRX active time.

In some embodiments, the second terminal equipment is in an active state at a slot when the first terminal equipment performs retransmission of the sidelink data.

The embodiment of this disclosure further provides a terminal equipment; however, this disclosure is not limited thereto, and it may also be another equipment.

Figure 21:
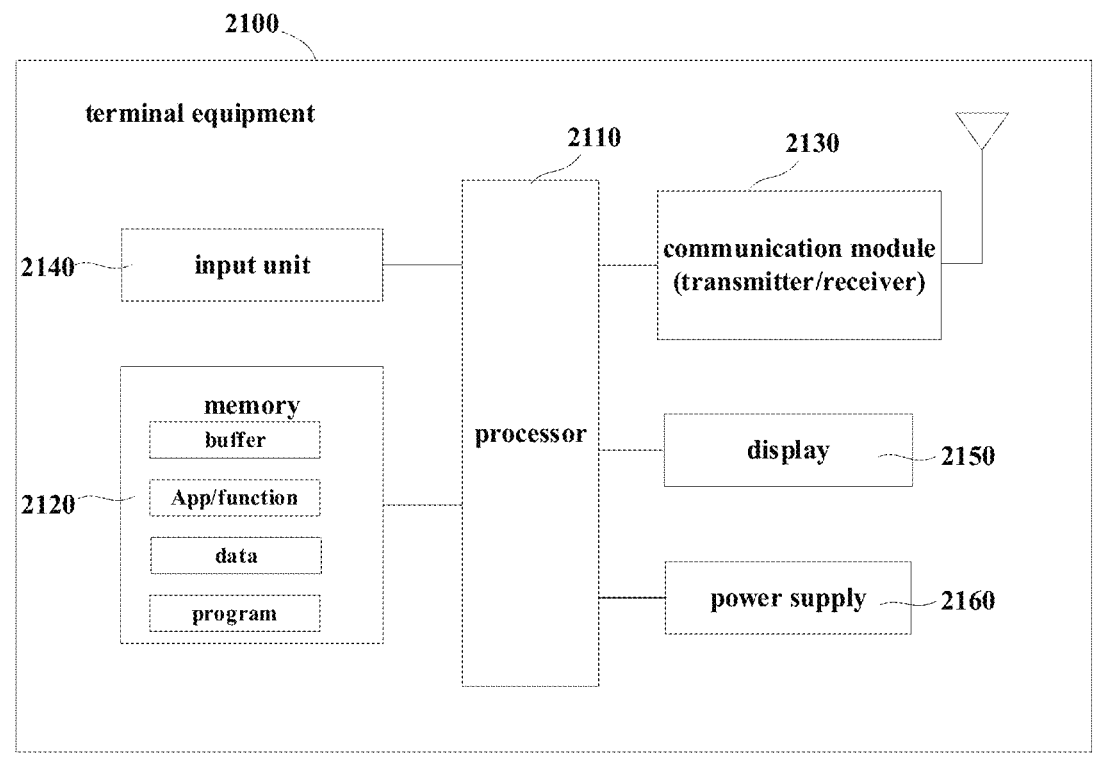
FIG. 21 is a schematic diagram of a terminal equipment of an embodiment of this disclosure.

FIG. 21 is a schematic diagram of a structure of a terminal equipment of the embodiment of this disclosure. As shown in FIG. 21, a terminal equipment 2100 may include a processor 2110 and a memory 2120, the memory 2120 storing data and a program and being coupled to the processor 2110. It should be noted that this figure is illustrative only, and other types of structures may also be used, so as to supplement or replace this structure and achieve a telecommunications function or other functions.

For example, the processor 2110 may be configured to execute a program to carry out the methods as described in the embodiments of the first to fourth aspects.

As shown in FIG. 21, the terminal equipment 2100 may further include a communication module 2130, an input unit 2140, a display 2150, and a power supply 2160, wherein functions of the above components are similar to those in the related art, which shall not be described herein any further. It should be noted that the terminal equipment 2100 does not necessarily include all the parts shown in FIG. 21, and the above components are not necessary. Furthermore, the terminal equipment 2100 may include parts not shown in FIG. 21, and the related art may be referred to.

An embodiment of this disclosure provides a computer readable program, which, when executed in a terminal equipment, causes the terminal equipment to carry out the methods as described in the embodiments of the first to fourth aspects.

An embodiment of this disclosure provides a computer storage medium, including a computer readable program, which causes a terminal equipment to carry out the methods as described in the embodiments of the first to fourth aspects.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

1. A resource selection method, applicable to a first terminal equipment, the first terminal equipment transmitting sidelink data to a second terminal equipment, the second terminal equipment being configured with sidelink discontinuous reception (SL DRX), and the method including:

generating a first candidate resource set and a second candidate resource set by the first terminal equipment, the first candidate resource set being a set of all candidate resources within an overlapped time period of a selection window of the first terminal equipment and at least one continuous SL DRX active time of the second terminal equipment during the selection window;

respectively determining candidate resources in the first candidate resource set available for sidelink data transmission and candidate resources in the second candidate resource set available for sidelink data transmission by the first terminal equipment to obtain a first candidate resource subset and a second candidate resource subset; and selecting resources for transmitting a first predetermined number of times of transmission of sidelink data in the first candidate resource subset, and selecting resources for transmitting a remained number of times of transmission of sidelink data in the second candidate resource subset, by the first terminal equipment.

2. The method according to supplement 1, wherein the first candidate resource set is one of the following:

a set of all candidate resources within an overlapped time period of the selection window of the first terminal equipment and all continuous SL DRX active time of the second terminal equipment during the selection window; or a set of all candidate resources within an overlapped time period of the selection window of the first terminal equipment and a first continuous SL DRX active time of the second terminal equipment during the selection window or a next continuous SL DRX active time of the second terminal equipment after the selection window starts.

3. The method according to supplement 2, wherein the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

4. The method according to supplement 1, wherein the first candidate resource set is one of the following:

a set of all candidate resources within a first sub-selection window of the selection window of the first terminal equipment; or a set of all candidate resources within all sub-selection windows of the selection window of the first terminal equipment, wherein the sub-selection window refers to a time period when the selection window of the first terminal equipment overlaps with the continuous SL DRX active time of the second terminal equipment during the selection window.

5. The method according to supplement 1, wherein the second candidate resource set is one of the following:

a set of remaining candidate resources within the selection window of the first terminal equipment other than the first candidate resource set;

a set of all candidate resources within the selection window of the first terminal equipment;

a set of remaining candidate resources within the selection window of the first terminal equipment other than the first candidate resource set and candidate resources before a predetermined time unit within the selection window of the first terminal equipment; or a set of remaining candidate resources within the selection window of the first terminal equipment other than candidate resources before a predetermined time unit, wherein the predetermined time unit refers to an overlapped first slot of the selection window of the first terminal equipment and a first continuous SL DRX active time of the second terminal equipment during the selection window or a next continuous SL DRX active time of the second terminal equipment after the selection window starts.

6. The method according to supplement 1, wherein an RSRP threshold used in determining the first candidate resource subset is less than an RSRP threshold used in determining the second candidate resource subset; and/or, a value of a transmission priority used in determining the first candidate resource subset is less than a value of a transmission priority used in determining the second candidate resource subset; and/or, a reporting proportion for first candidate resource sets with identical priorities is greater than or less than a value to which the second candidate resource set corresponds.

7. The method according to supplement 1, wherein the method further includes:

receiving by a physical layer of the first terminal equipment, a transmission parameter for the first candidate resource set and a transmission parameter for the second candidate resource set notified by a higher layer of the first terminal equipment, wherein a value of a transmission priority in the transmission parameter for the first candidate resource set is less than a value of a transmission priority in the transmission parameter for the second candidate resource set, and/or, the number of sub-channels for transmission of sidelink data in a slot in the transmission parameter for the first candidate resource set is greater than or less than the number of sub-channels for transmission of sidelink data in a slot in the transmission parameter for the second candidate resource set.

8. The method according to supplement 1, wherein the method further includes:

receiving by the physical layer of the first terminal equipment, a parameter for indicating discontinuous reception configuration of the second terminal equipment, notified by a higher layer of the first terminal equipment, the parameter including at least one of the following:

an operating period, an offset and a size of the discontinuous reception duration timer (drx-OnDurationTimer) on the sidelink;

a size of the discontinuous reception inactivity timer (drx-InactivityTimer) on the sidelink;

a size of a discontinuous reception hybrid automatic retransmission round-trip time timer (drx-HARQ-RTT-Timer) on the sidelink; or a size of the discontinuous reception retransmission timer (drx-RetransmissionTimer) on the sidelink.

9. The method according to supplement 3 or 8, wherein running of the timer is unicast-specific or is common.

10. The method according to supplement 1, wherein the method further includes:

receiving by the physical layer of the first terminal equipment, indication information for indicating an equipment type of the second terminal equipment, and/or indication information for indicating a cast type of a current service, transmitted by a higher layer of the first terminal equipment.

11. The method according to supplement 1, wherein the number of transmission resources selected by the first terminal equipment in the first candidate resource subset is predefined, or is determined by at least one of the following factors:

a total number of selected times of transmission and/or a time length of an SL DRX active time of the second terminal equipment in a PDB to which the transport block (TB) corresponds or a ratio of the time length to a total length;

a data packet priority of the sidelink data; or a result of measuring a channel busy ratio (CBR).

12. The method according to any one of supplements 1-8 and 10-11, wherein the first terminal equipment is configured with partial sensing, and the overlapping refers to overlapping of the continuous SL DRX active time and a candidate slot set selected by the physical layer of the first terminal equipment in the selection window of the first terminal equipment.

13. A resource selection method, applicable to a first terminal equipment, the first terminal equipment transmitting sidelink data to a second terminal equipment, the second terminal equipment being configured with sidelink discontinuous reception, and the method including:

generating a third candidate resource set by the first terminal equipment;

determining candidate resources available for sidelink data transmission in the third candidate resource set by the first terminal equipment to obtain a third candidate resource subset; and selecting, by the first terminal equipment, resources for transmitting sidelink data in the third candidate resource subset, wherein the third candidate resource subset includes candidate resources in the selection window of the first terminal equipment other than all candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts.

13a. The method according to supplement 13, wherein the third candidate resource set generated by the first terminal equipment does not include all candidate resources in the selection window of the first terminal equipment before the predetermined time unit, or the first terminal equipment excludes all candidate resources in the selection window of the first terminal equipment before the predetermined time unit from the generated third candidate resource set.

14. The method according to supplement 13, wherein the first terminal equipment postpones a time domain position of a starting time of the selection window to the predetermined time unit.

15. The method according to supplement 13, the method further includes:

delaying, by a higher layer of the first terminal equipment to a physical layer of the first terminal device, a notification of parameters related to resource selection of the third candidate resource set to a predetermined time before a first slot of a next continuous SL DRX active time of a current time of the second terminal equipment.

16. The apparatus according to supplement 13, wherein, if the number of overlapped slots of the selection window of the first terminal equipment and a first continuous SL DRX active time of the second terminal equipment during the selection window or a next continuous SL DRX active time of the second terminal equipment after the selection window starts is less than a predetermined threshold, an overlapped first slot of the selection window of the first terminal equipment and a further next SL DRX active time of the second terminal equipment after the selection window starts is taken as the predetermined time unit.

17. The apparatus according to any one of supplements 14-16, wherein the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

18. The apparatus according to supplement 17, wherein running of the timer on the sidelink is unicast-specific or is common.

19. The apparatus according to any one of supplements 14-16, wherein the first terminal equipment is configured with partial sensing, and the overlapping refers to overlapping of the continuous SL DRX active time and a candidate slot set selected by the physical layer of the first terminal equipment in the selection window of the first terminal equipment.

20. A resource selection method, applicable to a first terminal equipment, the first terminal equipment transmitting sidelink data to a second terminal equipment, the second terminal equipment being configured with sidelink discontinuous reception, and the method including:

selecting by the first terminal equipment transmission resources for transmitting sidelink data in a candidate resource subset, wherein, the first terminal equipment first selects one transmission resource in the candidate resource subset, the one transmission resource being selected in candidate resources of an overlapped time period of a selection window of the first terminal equipment and a continuous SL DRX active time of the second terminal equipment during the selection window;

and the first terminal equipment selects remaining transmission resources in the candidate resource subset other than candidate resources before a predetermined time unit of the selection window of the first terminal equipment, the predetermined time unit referring to an overlapped first slot of the period of the selection window of the first terminal equipment and a continuous SL DRX active time of the second terminal equipment where the first selected transmission resource is present.

21. The method according to supplement 20, wherein the candidate resource subset includes a first candidate resource subset and a second candidate resource subset, the first candidate resource subset being a candidate resource set available for sidelink data transmission in a first candidate resource set, the first candidate resource set being a set of all candidate resources within an overlapped time period of a selection window of the first terminal equipment and at least one continuous SL DRX active time of the second terminal equipment during the selection window, and the second candidate resource subset being a candidate resource set available for sidelink data transmission in a second candidate resource set, the second candidate resource set being a set of remaining candidate resources within the selection window of the first terminal equipment other than candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts;

and the first terminal equipment selects the one transmission resource in the first candidate resource subset, and selects the remaining transmission resources in the second candidate resource sub set.

22. The method according to supplement 20, wherein, if the number of overlapped slots of the selection window of the first terminal equipment and a first continuous SL DRX active time of the second terminal equipment during the selection window or a next continuous SL DRX active time of the second terminal equipment after the selection window starts is less than a predetermined threshold, an overlapped first slot of the selection window of the first terminal equipment and a further next SL DRX active time of the second terminal equipment after the selection window starts is taken as the predetermined time unit.

23. The method according to supplement 20, wherein, the one transmission resource is a resource used in initial transmission of the sidelink data, or the one transmission resource is not a resource used in initial transmission of the sidelink data.

24. The method according to supplement 20, wherein, the first terminal equipment selects the one transmission resource in candidate resources of an overlapped time period of the selection window of the first terminal equipment and a first continuous SL DRX active time of the second terminal equipment during the selection window;

and if the candidate resource set does not include the candidate resource, the first terminal equipment selects the one transmission resource in candidate resources of an overlapped time period of the selection window of the first terminal equipment and a next continuous SL DRX active time of the second terminal equipment during the selection window, until the one transmission resource is selected.

25. The method according to supplement 20 or 21, wherein the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

26. The method according to supplement 25, wherein running of the timer on the sidelink is unicast-specific or is common.

27. The apparatus according to supplement 20 or 21, wherein the first terminal equipment is configured with partial sensing, and the overlapping refers to overlapping of the continuous SL DRX active time and a candidate slot set selected by a physical layer in the selection window of the first terminal equipment.

28. A data transmission method, applicable to a second terminal equipment, a first terminal equipment transmitting sidelink data to the second terminal equipment, the second terminal equipment being configured with discontinuous reception, and the method including:

receiving by the second terminal equipment during a continuous SL DRX active time, sidelink data transmitted by the first terminal equipment, wherein the second terminal equipment is at active time at a slot when the first terminal equipment performs next time of retransmission of the sidelink data.

29. A terminal equipment, including a memory and a processor, the memory storing a computer program, and the processor being configured to execute the computer program to carry out the method as described in any one of supplements 1-28.

30. A communication system, including a first terminal equipment and a second terminal equipment, the first terminal equipment transmitting sidelink data to the second terminal equipment, the second terminal equipment being configured with SL DRX, wherein, the first terminal equipment generates a first candidate resource set and a second candidate resource set, respectively determines candidate resources in the first candidate resource set available for sidelink data transmission and candidate resources in the second candidate resource set available for sidelink data transmission to obtain a first candidate resource subset and a second candidate resource subset, and selects resources for transmitting a first predetermined number of times of transmission of sidelink data in the first candidate resource subset, and select resources for transmitting a remained number of times of transmission of sidelink data in the second candidate resource subset;

and the second terminal equipment receives the sidelink data at the configured continuous SL DRX active time.

31. A communication system, including a first terminal equipment and a second terminal equipment, the first terminal equipment transmitting sidelink data to the second terminal equipment, the second terminal equipment being configured with SL DRX, wherein, the first terminal equipment generates a third candidate resource set, determines candidate resources available for sidelink data transmission in the third candidate resource set to obtain a third candidate resource subset, and selects resources for transmitting sidelink data in the third candidate resource subset, wherein the third candidate resource subset includes candidate resources in the selection window of the first terminal equipment other than all candidate resources before a predetermined time unit, the predetermined time unit referring to an overlapped first slot of the selection window of the first terminal equipment and a first continuous SL DRX active time of the second terminal equipment during the selection window or a next continuous SL DRX active time of the second terminal equipment after the selection window starts;

and the second terminal equipment receives the sidelink data at the configured continuous SL DRX active time.

32. A communication system, including a first terminal equipment and a second terminal equipment, the first terminal equipment transmitting sidelink data to the second terminal equipment, the second terminal equipment being configured with SL DRX, wherein, the first terminal equipment selects transmission resources for transmitting sidelink data in a candidate resource subset, wherein the first terminal equipment first selects one transmission resource in the candidate resource subset, the one transmission resource being selected in candidate resources of an overlapped time period of a selection window of the first terminal equipment and a continuous SL DRX active time of the second terminal equipment during the selection window, and the first terminal equipment selects remaining transmission resources in the candidate resource subset other than candidate resources before a predetermined time unit of the selection window of the first terminal equipment, the predetermined time unit referring to an overlapped first slot of the period of the selection window of the first terminal equipment and a continuous SL DRX active time of the second terminal equipment where the first selected transmission resource is present;

and the second terminal equipment receives the sidelink data at the configured continuous SL DRX active time.

33. The communication systems according to any one of supplements 30-32, wherein the second terminal equipment is in an active state at a slot when the first terminal equipment performs retransmission of the sidelink data.

What is claimed is:

1. A resource selection apparatus, configured in a first terminal equipment, the resource selection apparatus comprising:

a transmitter configured to transmit sidelink data to a second terminal equipment, the second terminal equipment being configured with sidelink discontinuous reception (SL DRX), and processor circuitry configured to:

generate a first candidate resource set and a second candidate resource set, the first candidate resource set being a set of one or more candidate resources within an overlapped time period of a selection window of the first terminal equipment and at least one continuous SL DRX active time of the second terminal equipment during the selection window, the second candidate resource set being a set of all candidate resources within the selection window of the first terminal equipment;

determine candidate resources in the first candidate resource set available for sidelink data transmission to obtain a first candidate resource subset; and determine candidate resources in the second candidate resource set available for sidelink data transmission to obtain a second candidate resource subset.

2. The resource selection apparatus according to claim 1, wherein the processor circuitry is further configured to select resources for transmitting a first predetermined number of times of transmission of sidelink data in the first candidate resource subset, and select resources for transmitting a remained number of times of transmission of sidelink data in the second candidate resource subset.

3. The resource selection apparatus according to claim 1, wherein, the first candidate resource set is one of the following:

a set of one or more candidate resources within an overlapped time period of the selection window of the first terminal equipment and all continuous SL DRX active times of the second terminal equipment during the selection window; or a set of one or more candidate resources within an overlapped time period of the selection window of the first terminal equipment and a first continuous SL DRX active time of the second terminal equipment during the selection window or a next continuous SL DRX active time of the second terminal equipment after the selection window starts; and the second candidate resource set is one of the following:

a set of remaining candidate resources within the selection window of the first terminal equipment other than the first candidate resource set;

a set of remaining candidate resources within the selection window of the first terminal equipment other than the first candidate resource set and candidate resources before a predetermined time unit within the selection window of the first terminal equipment; or a set of remaining candidate resources within the selection window of the first terminal equipment other than candidate resources before a predetermined time unit, wherein the predetermined time unit refers to an overlapped first slot of the selection window of the first terminal equipment and a first continuous SL DRX active time of the second terminal equipment during the selection window or a next continuous SL DRX active time of the second terminal equipment after the selection window starts.

4. The resource selection apparatus according to claim 1, wherein the continuous SL DRX active time of the second terminal equipment during the selection window is at least one continuous slot, the at least one continuous slot being at least one of the following:

an operating period of a discontinuous reception duration timer (drx-OnDurationTimer) on a sidelink of the second terminal equipment;

an operating period of a discontinuous reception inactivity timer (drx-InactivityTimer) on a sidelink of the second terminal equipment; or an operating period of a discontinuous reception retransmission timer (drx-RetransmissionTimer) on a sidelink of the second terminal equipment.

5. The resource selection apparatus according to claim 1, wherein an RSRP threshold used by the processor circuitry in determining the first candidate resource subset is less than an RSRP threshold used thereby in determining the second candidate resource subset; and/or, a value of a transmission priority used by the processor circuitry in determining the first candidate resource subset is less than a value of a transmission priority used thereby in determining the second candidate resource subset; and/or, a reporting proportion for first candidate resource sets with identical priorities determined by the processor circuitry is greater than or less than a value to which the second candidate resource set corresponds.

6. The resource selection apparatus according to claim 1, wherein the resource selection apparatus further comprises:

a receiver configured to, at a physical layer of the first terminal equipment, receive a transmission parameter for the first candidate resource set and a transmission parameter for the second candidate resource set notified by a higher layer of the first terminal equipment, wherein a value of a transmission priority in the transmission parameter for the first candidate resource set is less than a value of a transmission priority in the transmission parameter for the second candidate resource set, and/or, the number of sub-channels for transmission of sidelink data in a slot in the transmission parameter for the first candidate resource set is greater than or less than the number of sub-channels for transmission of sidelink data in a slot in the transmission parameter for the second candidate resource set.

7. The resource selection apparatus according to claim 1, wherein the resource selection apparatus further comprises:

a receiver configured to, at a physical layer of the first terminal equipment, receive a parameter for indicating discontinuous reception configuration of the second terminal equipment, notified by a higher layer of the first terminal equipment.

8. The resource selection apparatus according to claim 7, wherein the parameter for indicating discontinuous reception configuration of the second terminal equipment includes at least one of the following:

an operating period, an offset and a size of the discontinuous reception duration timer (drx-OnDuration-Timer) on the sidelink;

a size of the discontinuous reception inactivity timer (drx-Inactivity Timer) on the sidelink;

a size of a discontinuous reception hybrid automatic retransmission round-trip time timer (drx-HARQ-RTT-Timer) on the sidelink; or a size of the discontinuous reception retransmission timer (drx-RetransmissionTimer) on the sidelink.

9. The resource selection apparatus according to claim 2, wherein the number of transmission resources selected by the processor circuitry in the first candidate resource subset is predefined, or determined by at least one of the following factors:

a total number of times of transmission of the sidelink data and/or a length of a time of the second terminal equipment in a discontinuous reception active state in a PDB to which a current transport block corresponds or a ratio of the length to a total length;

a priority of packets of the sidelink data; or a measured channel busy ratio (CBR) result.

10. The resource selection apparatus according to claim 1, wherein the processor circuitry is further configured to control to perform partial sensing, and the overlapping refers to overlapping of the continuous SL DRX active time and a candidate slot set selected by the physical layer of the first terminal equipment in the selection window of the first terminal equipment.

* * * * *